United States Patent
Miller

(10) Patent No.: US 11,172,059 B2
(45) Date of Patent: *Nov. 9, 2021

(54) NETWORKING SYSTEMS, PROTOCOLS, AND METHODS FOR CONTROLLING TARGET DEVICES

(71) Applicant: AVI-On Labs, LLC, San Francisco, CA (US)

(72) Inventor: Eric L. Miller, San Francisco, CA (US)

(73) Assignee: AVI-ON Labs, LLC, San Francisco, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/292,983

(22) Filed: Mar. 5, 2019

(65) Prior Publication Data

US 2020/0036828 A1 Jan. 30, 2020

Related U.S. Application Data

(63) Continuation of application No. 15/684,026, filed on Aug. 23, 2017, now Pat. No. 10,237,391, which is a continuation of application No. 14/636,852, filed on Mar. 3, 2015, now Pat. No. 9,781,245.

(60) Provisional application No. 62/086,975, filed on Dec. 3, 2014, provisional application No. 62/017,961, filed on Jun. 27, 2014, provisional application No. 61/947,122, filed on Mar. 3, 2014.

(51) Int. Cl.
*H04M 1/72415* (2021.01)
*H04H 20/08* (2008.01)
*H04H 20/61* (2008.01)
*H04W 4/70* (2018.01)
*H04W 4/80* (2018.01)

(52) U.S. Cl.
CPC ........ *H04M 1/72415* (2021.01); *H04H 20/08* (2013.01); *H04H 20/61* (2013.01); *H04W 4/70* (2018.02); *H04W 4/80* (2018.02)

(58) Field of Classification Search
CPC ... H04H 20/08; H04H 20/61; H04M 1/72415; H04W 4/70; H04W 4/80
See application file for complete search history.

(56) References Cited

U.S. PATENT DOCUMENTS

| | | | | |
|---|---|---|---|---|
| 2013/0171981 A1* | 7/2013 | Woo | ....................... | G08C 23/04 455/420 |
| 2013/0293361 A1* | 11/2013 | Posa | ....................... | G05B 15/02 340/12.28 |
| 2014/0121786 A1* | 5/2014 | Chen | ....................... | G05B 15/02 700/19 |
| 2015/0108901 A1* | 4/2015 | Greene | .................. | H05B 47/16 315/149 |

* cited by examiner

*Primary Examiner* — Timothy X Pham
(74) *Attorney, Agent, or Firm* — Kramer Levin Naftalis & Frankel LLP

(57) ABSTRACT

Systems and methods are provided for controlling electric and electronic devices. The devices may communicate with each other in a many-to-many, peer-to-peer network to provide control functionality without the need for a central controller. Device-to-device control messages may be implemented over short range, wireless broadcast messages.

14 Claims, 14 Drawing Sheets

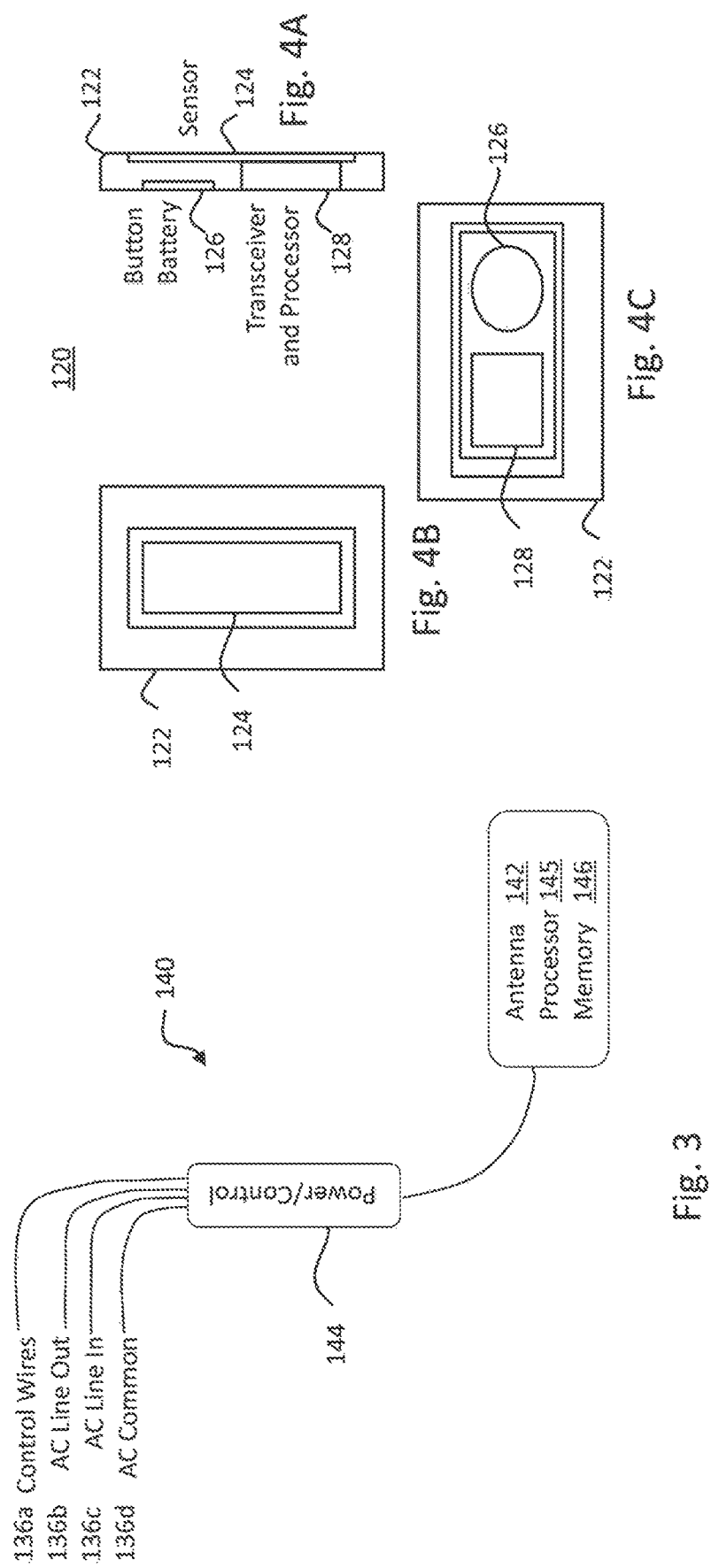

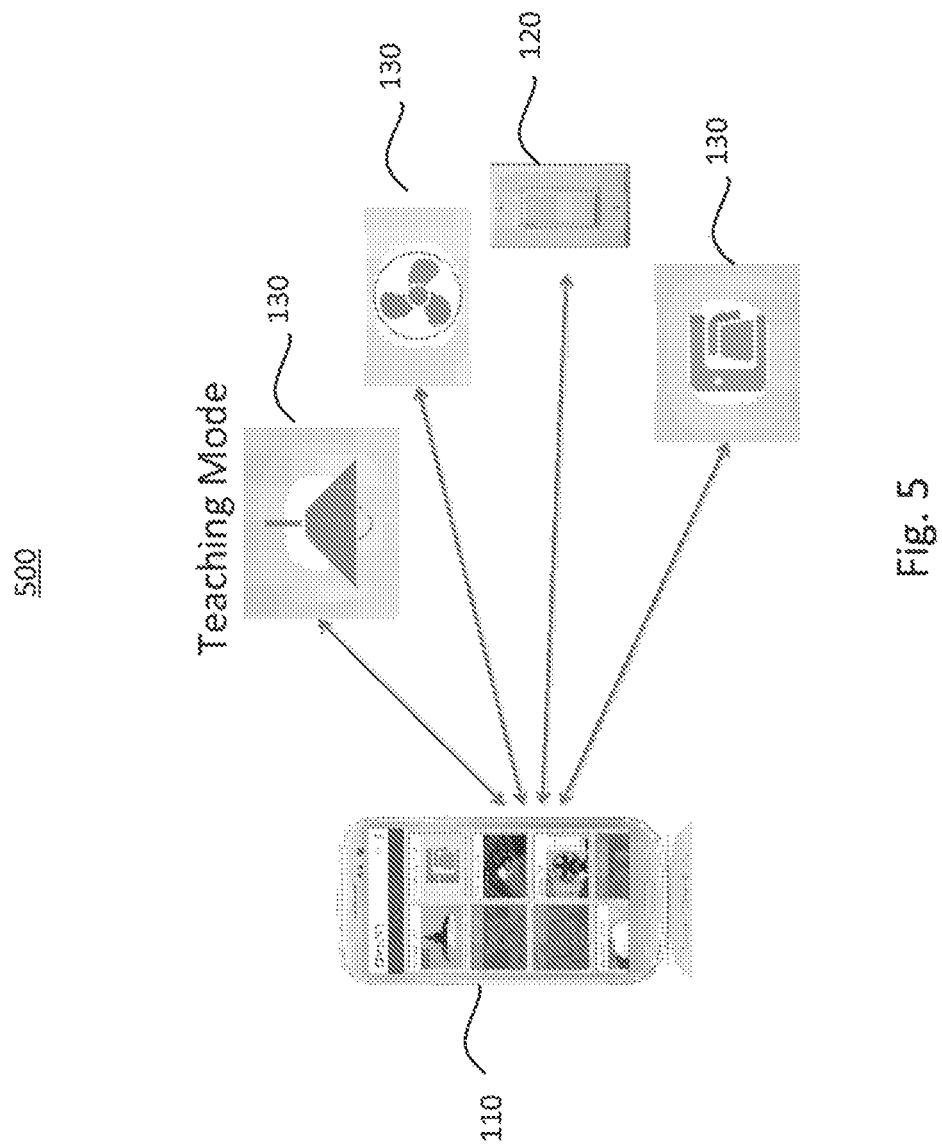

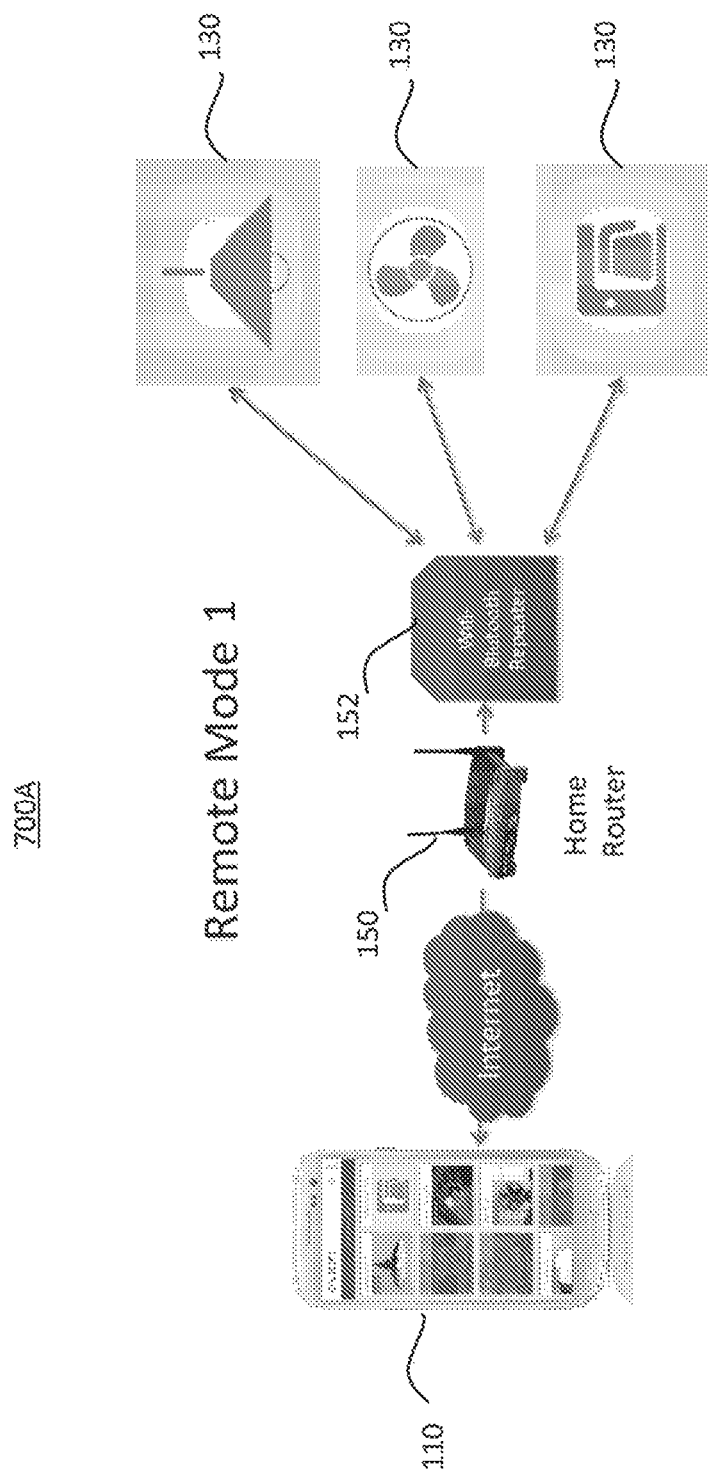

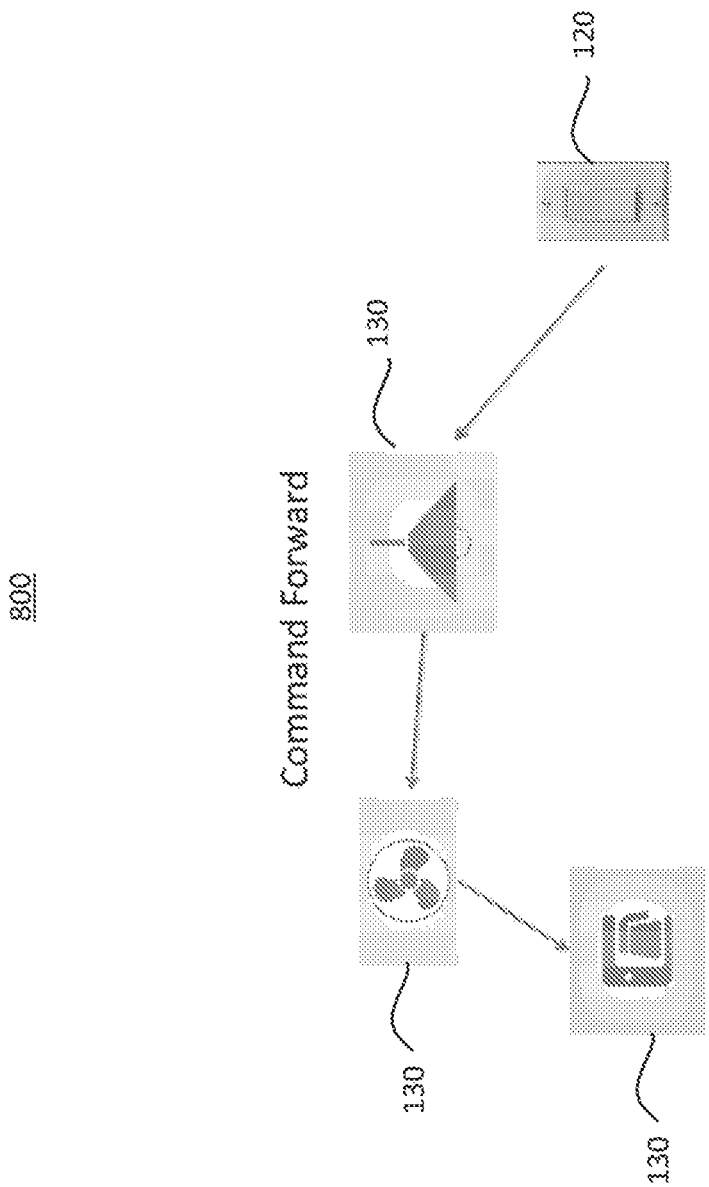

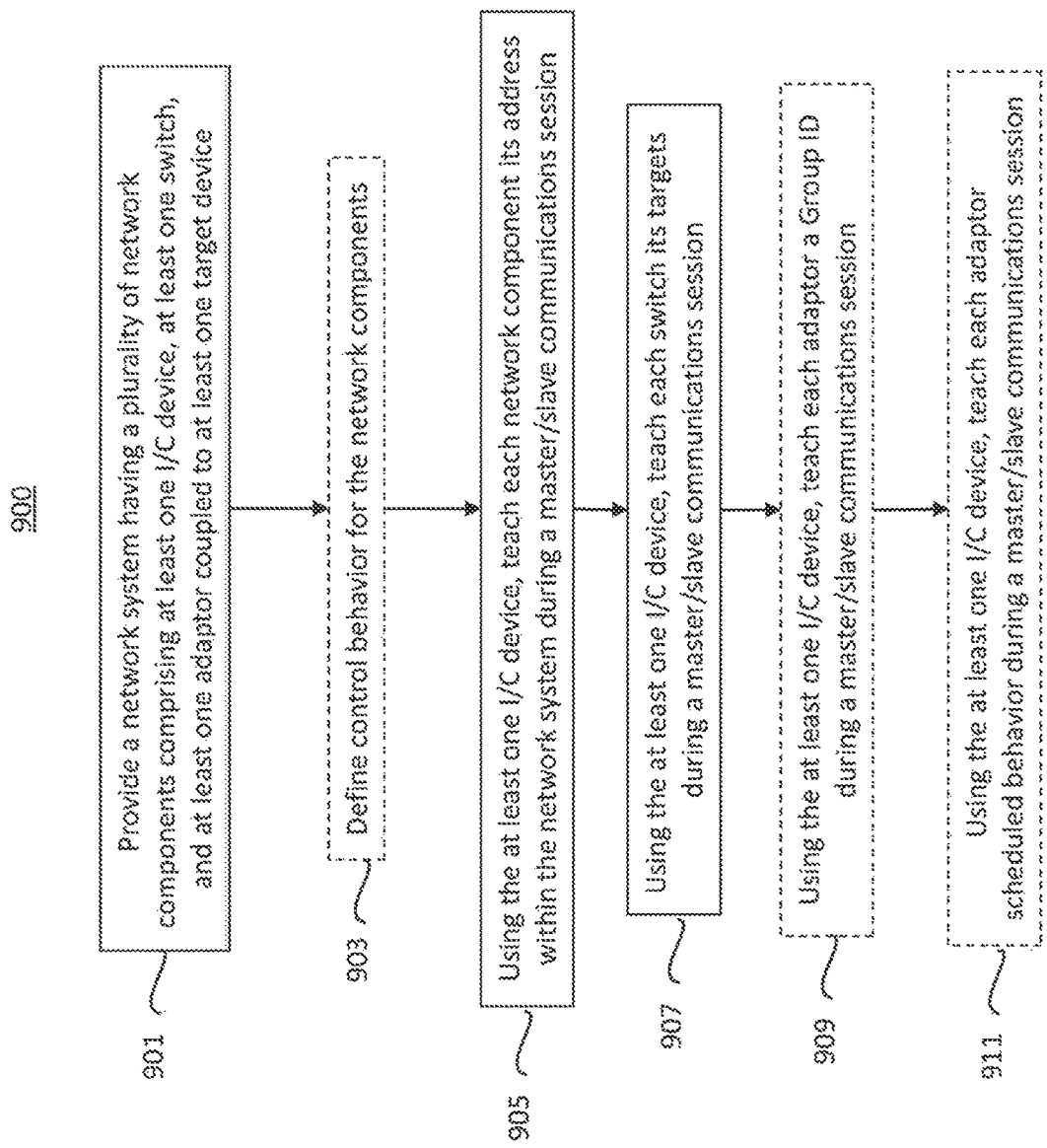

NETWORKING SYSTEMS, PROTOCOLS, AND METHODS FOR CONTROLLING TARGET DEVICES

CROSS-REFERENCE TO RELATED APPLICATIONS

This application is a continuation of U.S. patent application Ser. No. 15/684,026, now U.S. Pat. No. 10,237,391, which is a continuation of U.S. patent application Ser. No. 14/636,852, now U.S. Pat. No. 9,781,245, which claims the benefit of U.S. Provisional Patent Application Ser. No. 61/947,122, filed Mar. 3, 2014, U.S. Provisional Patent Application Ser. No. 62/017,961, filed Jun. 27, 2014, and U.S. Provisional Patent Application Ser. No. 61/086,975, filed Dec. 3, 2014, each of which is incorporated by reference herein in its entirety.

BACKGROUND

In most homes and buildings, turning on and off lights, lamps, or other devices is accomplished by toggling a switch that is wired into the building's electrical system. This paradigm requires the location of the lighting, fixtures, switches, and devices to be based on the location of the physical wires installed by licensed electricians, typically during initial construction. If there is a desire to relocate or any of the devices or to alter how the devices are controlled, there is no practical means to do so without moving and/or running additional fixed power wires.

The difficulties associated with adding on to or altering a structure's electrical system presents a number of inconveniences and costs to the building occupant. First, the locations of the fixtures and switches are established by the builder, not the occupant. Over time, usage changes and successive occupants need different configurations other than those envisioned by the builder. Second, moving fixtures and wiring is costly and disruptive. It requires construction professionals to relocate wires by tearing into walls and ceilings and then repairing and repainting entire rooms in order to mask the changes.

SUMMARY

While the power source for lighting, fixtures and other devices must be built into the walls, embodiments disclosed herein enable the switching function and the switches to be freed from fixed, high-voltage wiring. The inventive systems, methods, and protocols enable lighting and other electric and electronic devices to be controlled by battery-powered, radio-controlled switches, computers, and mobile smart phones.

Accordingly, networking systems, methods, and protocols are provided for controlling target devices. The protocols facilitate peer-to-peer communication between many low cost devices over a wireless network, enabling many-to-many control relationships while obviating the need for a central controller to supervise, control, or create the communications network.

According to some embodiments, the network systems may include three primary types of devices: initialization and control devices for configuring and controlling the network devices; adaptors for receiving, implementing, and rebroadcasting commands received over the network; and switches for sensing user input and communicating control commands to the adaptors. Generally speaking, the initialization and control devices may be used to teach the adaptors and switches their prescribed roles in the network system. Once taught, the adaptors and switches may communicate directly with each other in peer-to-peer fashion with or without the presence of a central controller.

A network system may further include a bridge device that can provide the system with remote interface capability without the need for a central controller node. The bridge device may be configured as a network component of the network system that provides an interface for accessing and operating the other configured network components. In some embodiments, the bridge device may be implemented as a radio device capable of communicating with the various other devices of the network system that may be in communication with a remote server via an Internet-connected device. In other embodiments, the bridge device may be configured as a bridge component that connects directly to the Internet for communication with the remote server. The bridge device may also be implemented in software or firmware resident on another device of the network system, such as an adaptor or switch, for example. Access to the interface of the bridge device for control of the network system may then be attained through connection to the remote server from any Internet-connected electronic device.

Methods for initializing and operating electric and electronic devices over the network are disclosed. The methods may involve providing a network system having one or more initialization and control devices, adaptors, switches, and electric devices. The methods may further include an initialization step, during which the initialization device may teach the adaptors and switches their respective roles within the network system. Initialization may include defining, for each switch and adaptor, its address, which devices to respond to, its schedules, and other behaviors. The methods may further include an operation step in which the switches and adaptors may communicate autonomously with or without the presence of a central controller.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 3 shows a schematic view of an adaptor, in accordance with some embodiments;

FIGS. 4A-4C show various cross-sectional and elevation views of an illustrative network switch, in accordance with some embodiments;

FIGS. 5-8 show pictorial representations of various network system modes, in accordance with some embodiments;

FIG. 9 shows a flowchart of an illustrative process for implementing a teaching mode of a network system, in accordance with some embodiments;

DETAILED DESCRIPTION OF THE DISCLOSURE

Network systems, protocols, and methods are provided for controlling electric and electronic devices. The benefits of freeing the switches from the fixed wiring in a building's electrical system are manifold. For example, the switches may be easily relocated according to changes in furniture arrangements, room usage patterns, and occupant preferences while reducing or avoiding wiring and rewiring costs and disruptions. Further, electric and electronic devices, such as lighting and fixtures, may be controlled from multiple locations and multiple controllers. Changing how the electric and electronic devices are controlled may also be accomplished without altering the building's fixed wiring plan.

The disclosed protocols and methods may be used to easily implement a network system for controlling a variety of electric and electronic devices. For example, the network system may control lighting fixtures, household appliances (e.g., dishwashers, ranges, washing machines, dryers, thermostats, air conditioning units, sump pumps, and electrically operated heaters and fireplaces), entertainment and productivity devices (e.g., televisions, media players, computers, and audio systems), security devices (e.g., alarm systems and video surveillance equipment), and/or any other type of electrically operated device or appliance. Such devices and appliances may be referred to herein as "target devices." A target device coupled to an adaptor may be referred to herein as a "controlled device."

Figure 1:
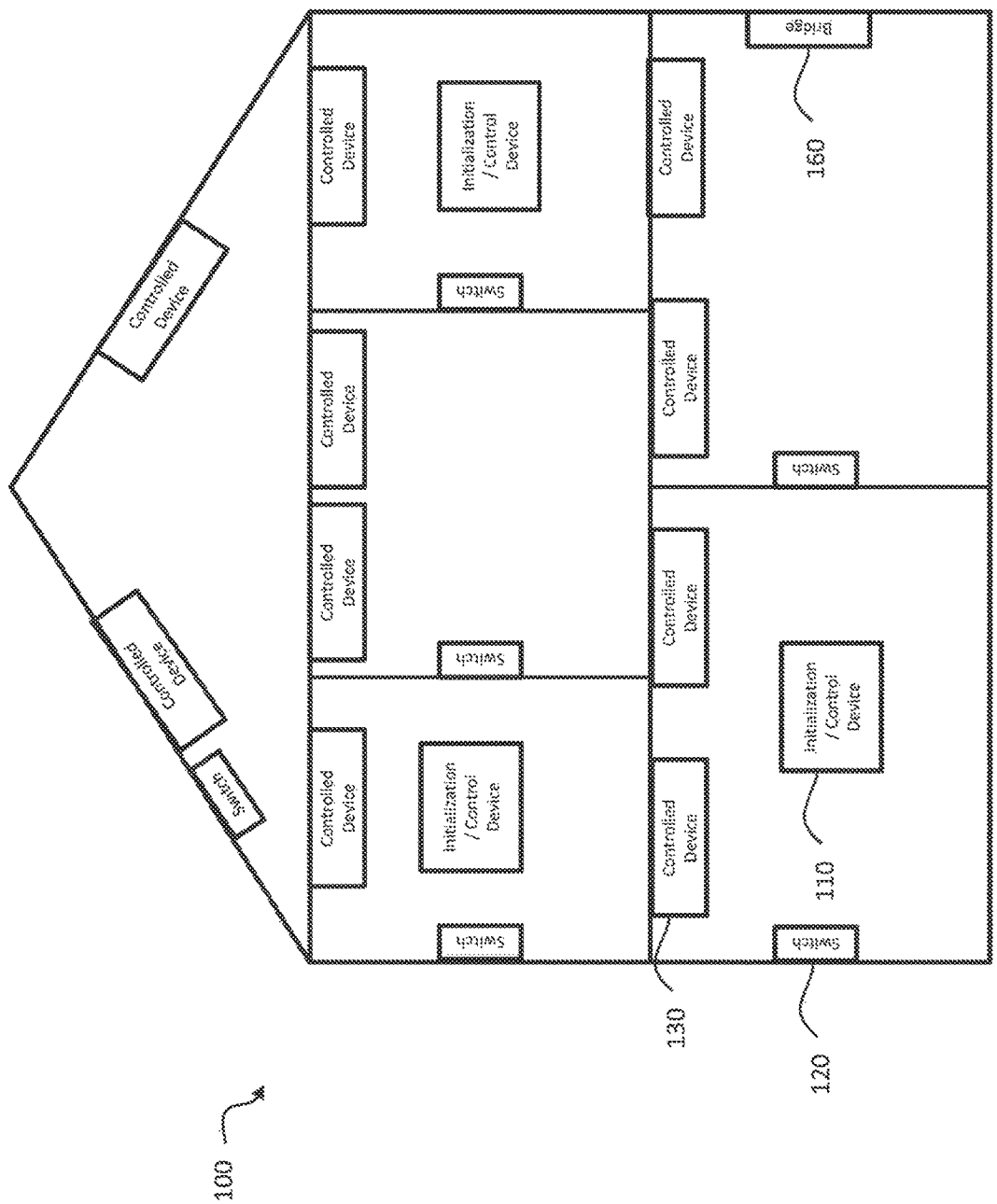
FIG. 1 depicts a schematic diagram of a network system for controlling target devices, in accordance with some embodiments.

FIG. 1 depicts a schematic diagram of network system 100 for controlling target devices, in accordance with some embodiments. Network system 100 may include one or more initialization/control ("I/C") devices 110, switches 120, controlled devices 130, and bridges 160. Network system 100 may be installed in any suitable fixed or moveable structure, such as a residential or commercial building, a tent, or a trailer, for example. I/C devices 110, switches 120, adaptors, which may be part of controlled devices 130, and bridges 160 may be referred to herein as "network components."

According to some embodiments, I/C devices 110 may serve dual functions in network system 100. First, I/C devices 110 may be used to configure all of the components of network system 100 (e.g., switches 120, adaptors in controlled devices 130, bridges 160, and other I/C devices 110). Configuration of these system components is described in detail below with respect to FIGS. 5 and 9. Generally speaking, however, a user may interact with computer programs running on one or more of I/C devices 110 to define desired system functionality, such as defining which switches 120 control which controlled devices 130, defining automatically scheduled behaviors for controlled devices 130, and so on.

Second, I/C devices 110 may be used as system controllers for controlling all or a subset of the various system components. Accordingly, a user interacting with a computer program installed on I/C devices 110 may be able to control individual switches 120 and/or individual controlled devices 130. In some embodiments, a user may interact with a user interface provided by the computer program to send commands to selected switches 120 and/or individual controlled devices 130. I/C devices 110 may facilitate control of various control functions as appropriate for the type of controlled device or devices present in network system 100.

Examples of electronic devices that may be used as I/C devices 110 may include any suitable type of electronic device operative to communicate with switches 120 and controlled devices 130. For example, I/C devices 110 can include digital media players, cellular telephones, smartphones, pocket-sized personal computers, personal digital assistants (PDAs), tablets, desktop computers, laptop computers, and/or any other suitable electronic device.

Communication between I/C devices 110 and switches 120 and/or controlled devices 130 may be implemented over the protocols described herein and/or over any other suitable wired or wireless interface, such as via Wi-Fi® (e.g., a 802.11 protocol), Ethernet, Bluetooth®, radio frequency systems (e.g., 900 MHz, 2.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), other relatively localized wireless communication protocol, or combinations thereof. In some embodiments, communications may be conducted over combinations of wired and wireless paths. As described in more detail below with respect to FIGS. 5-7, I/C devices 110 may communicate directly with switches 120 and controlled devices 130 or indirectly via an intermediary device such as a Wi-Fi® router, for example. Communications components provided within I/C devices 110, switches 120, controlled devices 130, and bridges 160 may be referred to herein as "transceivers" regardless of the particular mode or modes of communication used to implement the communications.

Switches 120 may be provided within network system 100 to sense user input and translate the input into a control signal for implementation by one or more controlled devices 130. The control signal may be transmitted via a switch transceiver. The type of control signal(s) generated by a particular switch may depend on the controlled devices 130 the switch is configured to control. In the simplest case, a switch may be configured to toggle a state (e.g., turn on or off) of one or more controlled devices 130. Thus, in some embodiments switches 120 may include one or more wall-mounted light switches configured to turn one or more lights on and off. Switches 120 may also include more complex switches, such as light dimmers, fan controllers, thermostat controllers, appliance controllers, and/or entertainment system controllers, for example. These more complex switches may utilize physical control elements (e.g., dials, sliders, and/or buttons) and/or virtual control elements (e.g., onscreen user interface elements) to generate control signals directed to one or more particular controlled devices 130.

In some embodiments, switches 120 may be powered by one or more power sources external to the structure's fixed, high-voltage electrical system, such as batteries, for example. Physically decoupling switches 120 from the structure's electrical system may beneficially allow for these physical components, which are often very difficult to move, to be placed in any convenient locations throughout the structure. Furthermore, adding additional switches to network system 100 may simply involve placing the additional switches within range of network system 100 and configuring the additional switches to control one or more controlled devices 130.

It should be understood that existing switches already hardwired into a structure's existing electrical system may be configured to control controlled devices 130 while continuing to be powered by the building's electrical system. Such hardwired switches may be retrofit with transceivers that facilitate communications between switches 120, controlled devices 130, bridges 160, and I/C devices 110. In these embodiments, some minor re-wiring of controlled devices 130 and switches 120 may be necessary to bypass the traditional hardwired switching functionality and provide constant, non-switched power to the switch.

Controlled devices 130 may include two main components, a target device and an adaptor. As discussed above, the target device may be any suitable electrical or electronic device capable of being controlled. An adaptor may include various components for receiving and implementing control signals generated by I/C devices 110 and/or switches 120. For example, an adaptor may include one or more of a transceiver for receiving control and/or initialization signals from I/C devices 110 and/or switches 120, a central processor, a memory, an antenna, a line power switch and/or a dimming circuit, one or more sensors (e.g., heat sensors, motion sensors), and a control output interface for implementing complex control commands (e.g., speed control, motion control, or other complex commands).

Instructions may be stored in the adaptor's memory that define various adaptor settings and behaviors. For example, the instructions may define which I/C devices 110 and/or switches 120 the adaptor should respond to, automated control schedules, and/or other behaviors. The instructions may be loaded into the adaptor's memory during an initialization process, as described in detail below with respect to FIGS. 5 and 9.

Bridge 160 can provide a remote interface to network system 100 to enable remote operation of the network's various network components. In this manner, network system 100 may be accessed and controlled even if I/C devices 110 are out of range without the need for a central controller. No central controller is necessary for remote control of network system 100 because bridge 160 can be configured as yet another network component, like switches 120 and controlled devices 130, for example. Accordingly, bridge 160 can provide access to network system 100 as a network component of the network, not as a gateway or central access point.

Bridge 160 can, therefore, be a low-cost, simple device configured to relay messages between network system 100 and a remote server. Generally speaking, bridge 160 can: permit remote visibility, via a remote device, of the current status of the various configured network components even while the remote device is out of range of network system 100; issue commands to network system 100 via the remote server and bridge 160 to monitor and/or change the status of one or more network components; and/or send a set of commands to a range of network components. Examples of functions that might not be permitted when accessing network system 100 via bridge 160 (e.g., to promote network security) may include: adding, deleting, or authenticating network components; updating usernames, passwords, or security keys; obtaining MAC addresses of network components; and creating or modifying network component groups or scenes. Scenes may generally be understood as pre-set control settings for one or more controlled devices 130 (e.g., turn on all kitchen lights and the coffee maker at 6 AM, dim all living room lights at 8 PM, or preheat oven and turn on stereo at 5 PM).

Bridge 160 can include a transceiver that enables communications between every other network using the protocol established for the network. Via the transceiver, bridge 160 can have visibility to all of the network components of network 100 including, for example, the address of each network component and its functionalities (e.g., whether the component is a switch or controlled device, which other components a particular component controls or responds to, etc.). Additionally, bridge 160 may be connected or connectable to a remote server via an outside network (e.g., the Internet) using a wired or wireless interface, such as one or more of the interfaces listed above, for example.

A remote device may then connect to the remote server to gain access to network system 100 via bridge 160. When the remote device connects to the remote server, commands directed to network system 100 can be relayed through the remote server to the interface of bridge 160. Because bridge 160 is secured to network system 100 during the initialization process, further security for bridge 160 may not be required. The remote server can be secured against unauthorized access using authentication procedures known in the art (e.g., passwords, two-factor authentication, etc.). Bridge 160 may be configured to connect to a router that facilitates communications to the remote server, which configuration may entail providing the bridge with security credentials to log into the remote server.

Bridge 160 may further include a central processor and a memory for storing instructions that can define its role in network system 100. For example, the instructions may define an interface for providing a remote device with access to the other network components of network system 100. Accordingly, the memory may store a database containing the relationships between the various network components, such as which switches 120 are configured to control which controlled devices 130, for example, and allow operation of switches 120 and controlled devices 130. The instructions may be loaded into the adaptor's memory during an initialization process.

The interface can grant a remote device access to network system 100 through bridge 160. In order to maintain security of the network, however, the functionality of interface may be limited only to accessing information that was previously defined during an initialization process. In this manner, a remote user may be permitted to connect to bridge 160 through the remote server and operate switches 120 and/or controlled devices 130 per the configuration data stored in the database of bridge 160. That is, while network components of network system can be controlled remotely, a remote user may be prevented from altering the configuration of network system 100 using bridge 160. Because bridge 160 can be configured during an initialization process by an account holder authorized to configure the network and bridge 160 must be within range of the network to operate, it may not be necessary for the device to have separate security access or to be granted security keys for the network. Remote access to network system 100 may, therefore, be permitted far more cheaply and easily than in systems that require a central controller or another non-network component device to facilitate remote access.

In some embodiments, bridge 160 can include a transceiver (e.g., a Bluetooth® transceiver) that facilitates communications with the other network components of network system 100 and a communications interface to a separate device (e.g., a PC, tablet, or laptop computer) capable of communications with the remote server via an outside network, such as the Internet, for example. As one particular example, bridge 160 may be implemented as a Universal Serial Bus ("USB") "dongle" that can be connected to an Internet-connected device, such as the family computer, for example. These embodiments advantageously permit bridge 160 to be manufactured relatively cheaply because the connection to the remote service is facilitated using another network-connected device. However, in order to maintain access to the remote server, that network-connected device must remain powered-on and connected to the outside network. In another example, bridge 160 may include a second transceiver (e.g., a Bluetooth® transceiver) to facilitate communications with the separate device.

In an alternative implementation, bridge 160 can include both the transceiver for communicating with the other network components as well as the wired or wireless interface to the remote server via the outside network. Accordingly, remote access to network system 100 may not be dependent on the availability of a separate network-connected device. As one example, bridge 160 may be a standalone device that communicates with the other network components of network system 100 via a Bluetooth® transceiver and with the remote server via a Wi-Fi® connection or other suitable wired or wireless network connection (e.g., an Ethernet, 3G, or 4G LTE connection) to the Internet. In the event that bridge 160 is capable of Wi-Fi® communications, I/C devices 110 may be used to configure the Wi-Fi® connection. For example, bridge 160 may recognize a list of available Wi-Fi® networks, provide that list to I/C devices 110 (e.g., using the transceiver), and connect to a selected Wi-Fi® network by receiving authentication information (e.g., a password) from I/C devices 110.

In still further implementations, an existing network component of network 100, such as one of one or more of switches 120 or adaptors 140 (disclosed in detail below) or a generic gateway device, for example, may be configured to carry out the functionalities of bridge 160. In these embodiments, software or firmware may be installed on the existing network component in order to provide an interface to grant a remote device access to control network system 100. The network component that implements the bridge functionality can then communicate, using either the communications protocol of network system 100 or another suitable wired or wireless communications protocol (e.g., WiFi®) with a device having a wired or wireless interface to the remote server via the outside network, such as a generic gateway or router, for example.

Figure 2:
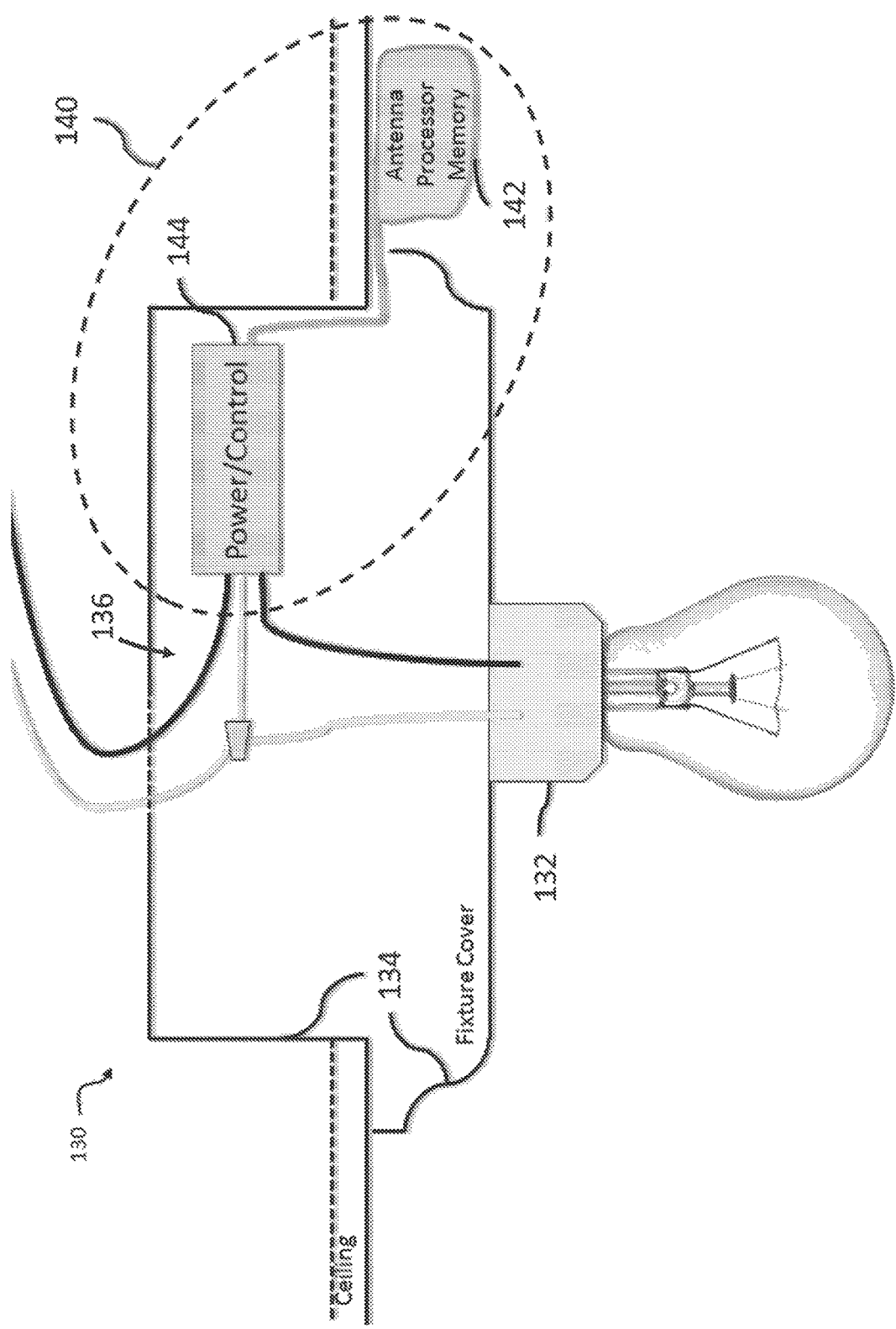
FIG. 2 shows a schematic view of a controlled device, in accordance with some embodiments.

FIG. 2 shows a schematic view of controlled device 130, in accordance with some embodiments. Controlled device 130 may include target device 132 coupled to adaptor 140 with one or more power/control lines 136 (shown in more detail in FIG. 3). Adaptor 140 may include antenna 142, which may be responsible for transmitting and/or receiving signals within a network system (e.g., network system 100 of FIG. 1), and power/control unit 144 for implementing control signals directed to target device 132.

In some embodiments, antenna 142 and other low-voltage components of adaptor 140, such as a processor and a memory, may be packaged separately from the high-voltage components housed in power/control unit 144. Packaging antenna 142 separately from the high-voltage components may prevent signal degradation caused by RF interference generated by target device 132, power/control unit 144, power/control lines 136, and/or any other high-voltage components of controlled device 130. Furthermore, the high-voltage components may be located inside a fixture 134 sized and shaped appropriately for target device 132. For example, in when the target device is a recessed light, fixture 134 may be a can that may shield antenna 142, located outside of fixture 134, from interference. Housing the high-voltage components of controlled device 130 within fixture 134 may support electrical safety certifications, improved visual concealment, and convenience, for example.

Power/control unit 144 may include a central processor for implementing control signals received at antenna 142. The central processor may be any suitable processing device, such as a microprocessor configured to perform operations based on execution of software and/or firmware instructions, or an ASIC that is configured to perform various operations, for example. Operations performed by the central processor may include retrieving data from and/or writing data to a memory of power/control unit 144. For example, during an initialization process, the central processor may receive instructions regarding one or more of an address, which control signals to implement, and/or automatically implemented scheduling instructions for controlled device 130. During operation, the central processor may access the information stored in the memory in order to implement control functions for target device 132.

Adaptor 140 may retransmit signals received at antenna 142 to enable the network system to operate as a peer-to-peer, many-to-many control system. That is, besides merely implementing control signals received at antenna 142, adaptor 140 (as well as all other network components of network system 100) may also rebroadcast received control signals to other components (e.g., other switches, adaptors, and bridges) of the network system. In this manner, the network system may operate using relatively short-range wireless signals, such as those used in the Bluetooth® protocol.

Power/control unit 144 may include a physical circuit for implementing simple power control functions for target device 132. For example, if target device 132 is a light, power/control unit 144 may include a line power switch and/or a dimming circuit to facilitate on/off and dimming control of target device 132, respectively. For more complex target devices, power/control unit 144 may include a control output interface for implementing more complex control commands, such as changing color, fan speed, operating mode, etc. In some embodiments, power/control unit 144 may be a generic controller capable of controlling many different types of target devices. In other embodiments, however, a specialized power/control unit 144 may be provided that specifically implements only the types of control functions available for the coupled target device 132.

FIG. 3 shows a schematic view of adaptor 140, in accordance with some embodiments. As discussed above, central processor 145 and memory 146 may be housed with antenna 142 separate and apart from power/control unit 144. In other embodiments, however, central processor 145 and/or memory 146 may be housed along with control circuitry in power/control unit 144 in order to give the housing for antenna 142 a smaller form factor.

Power and control signals for a target device (e.g., target device 132 of FIG. 2) may be generated within power/control unit 144 and sent to target device 132 via power/control lines 136. Power/control lines 136 may include one or more control lines 136a for carrying control signals from power/control unit 144 to the target device, AC Line Out 136b for carrying AC power from power/control unit 144 to the target device, AC Line In 136c for receiving AC power from the structure's fixed electrical wiring system, and AC Common (Neutral) Line 136d. Simple on/off or dimming control may be implemented within power/control unit 144 by varying the average power provided over AC Line Out 136b. More complex control commands may be generated by central processor 145 carried over control lines 136a to a control interface of the target device. Any suitable number of individual control lines 136a may be provided to implement available control functionality of the target device.

FIGS. 4A-4C show a side cross-sectional and front and back plan views, respectively, of an illustrative network switch 120, in accordance with some embodiments. Switch 120 may include housing 122, input sensor 124, battery 126, and communications unit 128. Like adaptor 140, switch 120 may be equipped with an antenna, which may be housed within communications unit 128, for transmitting, receiving, and/or retransmitting control signals to other components in a network system (e.g., network system 100 of FIG. 1).

In some modes of operation, switch 120 may generate control signals in the first instance, such as in response to receiving user input at input sensor 124. Input sensor 124 may be any type of device capable of sensing user input, such as a single-pole switch, a double-pole switch, a multi-way switch, a touch-sensitive switch (e.g., a touch sensitive capacitive or resistive sensor), a dimmer, a dial, or a slider, for example. Input sensor 124 may also be embodied as a touch-sensitive display screen with virtual interface elements (e.g., virtual buttons, sliders, dials, etc.) for providing control signals to other network devices, such as controlled devices 130. While control signals generated by switch 120 may be addressed to particular adaptors 140 within network system 100, such signals may be broadcast to all other switches and adaptors in range. Those other switches and adaptors may then implement the control signals, ignore the control signals, and/or retransmit the control signals to further components of network system 100.

In other modes of operation, switch 120 may passively receive control signals generated by other components of network system 100 and retransmit the control signals to other switches 120 and adaptors 140 in range. Thus, a control signal generated at a first component may, through initial transmission and subsequent retransmissions, reach every other component in network system 100 even if network system 100 extends beyond the range of the wireless signals transmitted by any individual network component.

In some embodiments, switch 120 may be controllable via another component of network system 100, such as I/C devices 110, a remote device (e.g., via bridge 160), and/or another switch, for example. It may be considerably more convenient for a user to control an individual switch (e.g., using I/C devices 110) rather than controlling individual adaptors 140, especially if the switch is configured to control multiple controlled devices 130. Thus, in addition to merely generating and retransmitting control signals, switch 120 may also receive and implement control signals received from other components of network system 100.

Switch 120 may be powered by a power source external to the structure's fixed electrical wiring system, thus enabling switch 120 to be installed or moved easily, without engaging in costly and disruptive construction activity. The external power source may be a battery, such as battery 126, for example.

It should be noted, however, that in some embodiments, pre-existing switches already wired into a structure's fixed electrical wiring system may be retrofit with communications unit 128 to allow such switches to communicate with other components of network system 100. In these embodiments, some minor rewiring of switch 120 and controlled devices 130 may be required to modify the control mechanism used by switch 120 to control corresponding controlled devices 130. For example, a single-pole light switch may be rewired such that constant power flows to communications unit 128 without the mechanical switching element being enabled to open and close the circuit. Rather, the mechanical switching element may instead be configured to send a signal to communications unit 128 for transmission to the other network components of network system 100.

Communications unit 128 may include a central processor, a memory, and a transceiver. These components may be substantially similar in structure and functionality to the corresponding components of adaptor 140. However, given that switch 120 may lack the high-voltage components of controlled device 130, the transceiver may be packaged with the other switch components without encountering adverse RF interference.

There are at least four key modes of the network system, methods, and protocols disclosed herein: teaching, operating, remote, and command forwarding modes. One or more of these key modes may be password protected to prevent unauthorized access to the network system. FIG. 5 shows a pictorial diagram of teaching mode 500. After establishing a user account, which may provide a user with access to configure and control a network system (e.g., network system 100 of FIG. 1) the user may initiate teaching mode 500.

In teaching mode 500, a user may, using a computer program installed on an I/C device (e.g., one of I/C devices 110 of FIG. 1, such as a desktop computer, laptop computer, tablet, or smartphone), define one or more desired configurations of the network system and teach each component (e.g., I/C devices 110, switches 120, and controlled devices 130) of the network system its role(s). Teaching mode 500 may utilize device-to-device communications sessions between an I/C device and the network components to be configured via a Bluetooth® master/slave communications session or using a similar communications protocol.

To ensure that the correct network component is connected to the I/C device and ready to be taught, each switch and adaptor in the network system may be provided with an indicator (e.g., a visible and/or an audible signal) that can provide a user with confirmation that the proper network component is connected in the device-to-device communications session. In some embodiments, exemplary visual signals may be output in the form of a blinking LED according to the following specifications:

| Service | Blink Device |
| --- | --- |
| Encryption | If Claimed - Password Level 1 encryption. |
| | If Unclaimed - No encryption. |
| Pre-condition | — |
| Post-condition | The LED or the device blinks the specified number of times. |

| Characteristic | Description | Byte | Access | Possible values |
| --- | --- | --- | --- | --- |
| Blink_Device_Rq | Times | 0 | WRITE | 1 . . . 9 |

Switch Specifications

Teaching mode 500 may utilize the following Teach_IDs protocol in order to establish the address of each switch of the network system:

TABLE 1

Teach Switch IDs Service

| Service | Teach Switch IDs |
|---|---|
| Encryption | |
| Pre-condition | Has to be claimable (Location Id and Device Id equal to 0). |
| Post-condition | The switch becomes claimed. |

| Characteristic | Description | Byte | Access | Possible values |
|---|---|---|---|---|
| Teach_Switch_Ids_Rq_P1 | Location Id | 0 | WRITE | 0 . . . 255 |
| | Device Id | 1 | WRITE | 0 . . . 255 |
| Teach_Switch_Ids_Rq_P3 | Password L1 (user) | 0-15 | WRITE | — |
| Teach_Switch_Ids_Rq_P4 | Password L2 (admin) | 0-15 | WRITE | Optional |

The Teach Switch IDs service can be used to add one or more switches (e.g., switches 120 of FIG. 1) to a network system. This service may be performed on switches that are "unclaimed," meaning that the switch is not already configured as part of a network system. The switch may associated with the network system by writing the network system's address, referred to above as the Teach_Ids_Rq_P1 characteristic, into the network component's memory. Subsequently the network component being configured may be assigned a unique Device Id for addressing the switch within the network system. Device Ids may be assigned using consecutively, randomly, or otherwise assigned to each network component as it is added to the network system. In some embodiments, the user may be permitted to define manually the switch's Device Id, which may be useful in circumstances in which the network system's control behavior is defined prior to the network components are configured.

Optionally, the network system may be configured with one or more levels of password protection. In particular, one or more components of the network system may be protected by an administrator (admin) password and one or more user passwords. While a user having the administrator password may be given full rights to define or alter all aspects of the network system configuration, user's having only individual user rights may be more restricted. For example, the administrator may have the right to add and configure new network components, remove network components from the network system, reset network components, perform network system diagnostics, etc., while an individual user may only be given the right to add or configure controlled device(s) that respond to a particular switch. Moreover, different users may be granted varying levels of rights to define or alter aspects of the network system. User and/or administrator passwords may be supplied during the Teach Switch Ids service to ensure that the user performing the service has the proper credentials to take the desired action.

Once a switch is added, its role in the network system may be defined using the following Teach Target protocol:

TABLE 2

Teach Target Service

| Service | Teach Target |
|---|---|
| Encryption | Password Level 1 encryption. |
| Pre-condition | Has to be a claimed device. |
| Post-condition | Target device/group id updated |

TABLE 2-continued

Teach Target Service

| Characteristic | Description | Byte | Access | Possible values |
|---|---|---|---|---|
| Teach_Target_Rq | Controlled Device/ Group Id | 0 | WRITE | 1 . . . 255 |
| | Type Flag | 1 | WRITE | 0 - Device Id 1 - Group Id |

The Teach Target service may be performed on any switch that has been added to, or claimed by, the network system (i.e., the Location ID for the network component is properly defined for the network system. In particular, the Teach Target service may be used to define which controlled device(s) a switch can control. Thus, during the Teach Target service, a user can define the Teach_Target_Rq characteristic as the Device Id for a particular controlled device or as the Group Id assigned to a group of controlled devices. The Teach Target service can then set a Type Flag to resolve the proper address based upon whether the flag indicates that the address is a Device Id or a Group Id.

In some embodiments, the switches may be configured to receive gesture-based inputs. The following table shows a set of exemplary gestures for providing input to a switch (e.g., switch 120 of FIGS. 4A-4C):

TABLE 3

Exemplary Switch Gesture Definitions

| Gesture | Meaning |
|---|---|
| | On/Off/Dimming mode |
| Tap once | Broadcast the reverse status message. If ON turn OFF y OFF turn ON. |
| Tap once, slide up or down and untouch | Broadcast the ON message and DIMMING value |
| Tap twice | Enter or exit color picker mode |
| | Color picker mode |
| Tap, slide (x, y) and untouch | Broadcast RGB values |
| Timeout of 'n' seconds | Exit color picker mode |

Accordingly, a user may initiate a device-to-device communications session between one of I/C devices 110 and each one of switches 120. During the communications sessions, and based upon the defined configuration(s), each of switches 120 may be assigned an address used for identification within the network system. Each of switches 120 may also be taught which other network components (e.g., I/C devices 110, bridge 160, and/or switches 120) to control based, for example, upon those components' addresses within the network system. In some embodiments, switches 120 may be taught automatically scheduled behaviors, such as time-based on/off switching behaviors, using similar services.

Adaptor Specifications

Teaching mode 500 may utilize the following Teach_IDs protocol in order to establish the address of each adaptor of the network system:

TABLE 4

Teach Adaptor Ids Service

| Service | Teach Ids | | |
|---|---|---|---|
| Characteristic | Description | Byte | Access |
| Adaptor_Teach_Ids_Rq | Location Id | 0 | WRITE (Dynamic) |
| | Device Id | 1 | WRITE (Dynamic) |
| | Claim code | 2-4 | WRITE (Dynamic) |
| | Password | 5-12 | WRITE (Dynamic) |

The Teach Adaptor IDs service can be used to add one or more adaptors (e.g., adaptors 140 of FIG. 2) to a network system. This service may be performed on adaptors that are "unclaimed," meaning that the adaptor is not already configured as part of a network system. The adaptor may associated with the network system by writing the network system's address, referred to above as the Adaptor_Teach_Ids_Rq characteristic, into the network component's memory. Subsequently the network component being configured may be assigned a unique Device Id for addressing the adaptor within the network system. As with assigning Device Ids for switches, Device Ids for adaptors may be assigned using consecutively, randomly, or otherwise assigned to each network component as it is added to the network system. In some embodiments, the user may be permitted to define manually the adaptor's Device Id, which may be useful in circumstances in which the network system's control behavior is defined prior to the network components are configured.

In some embodiments, a claim code may be assigned to an adaptor using the Teach Adaptor Ids service. The claim code can be an identifier used to identify the adaptor for removal from the network system.

As with switches, individual adaptors may be password protected. The applicable password may be saved in the adaptor's memory to authenticate a user attempting to access the network component.

In some embodiments, adaptors may be grouped together to allow for situations where it is desired to have a single switch control multiple controlled devices (e.g., several lights in a single room). A similar service may be performed on switches where it is desired to have one or more controlled devices controlled by two or more switches (e.g., to operate as a three-way switch).

TABLE 5

Teach Group Ids Service

| Service | Teach Group Ids | | |
|---|---|---|---|
| Characteristic | Description | Byte | Access |
| Adaptor_Teach_Group_Ids_Rq | Position | 0 | WRITE (Dynamic) |
| | Group Id | 1 | WRITE (Dynamic) |

In teaching mode 500, the Teach Group Ids service may be used to associate an adaptor with a Group Id. Using the Teach_Ids_Rq_P2 characteristic, the user may be able to define a Group Id for two or more network components. In some embodiments, the Global Id characteristic may not exist, and several network components may be grouped together by populating the Device Id characteristic with a shared address.

Teaching mode 500 may also permit a user to define automatic behavior for each adaptor in the network system. Exemplary teachable behaviors, shown in the two tables below, may include setting the date and time and controlling adaptor behaviors, such as daily timing behavior, and whether those timing behaviors differ whether the user is home or away, and control specifications, including on/off instructions, color balance, and dimming instructions, for example.

TABLE 6

Set Adaptor Time Service

| Service | Teach Date Time | | |
|---|---|---|---|
| Characteristic | Description | Byte | Access |
| Adaptor_Teach_Date_Time_Rq | Year | 0 | WRITE (Dynamic) |
| | Month | 1 | WRITE (Dynamic) |
| | Day | 2 | WRITE (Dynamic) |
| | Hour | 3 | WRITE (Dynamic) |
| | Minute | 4 | WRITE (Dynamic) |
| | Seconds | 5 | WRITE (Dynamic) |

TABLE 7

Teach Adaptor Schedule Service

| Service | Teach Schedule | | Encrypted with password. |
|---|---|---|---|
| Characteristic | Description | Byte | Access |
| Adaptor_Teach_Schedule_Rq | Position | 0 | WRITE (Dynamic) |
| | Monday | 1 [0] | WRITE (Dynamic) |
| | Tuesday | 1 [1] | WRITE (Dynamic) |
| | Wednesday | 1 [2] | WRITE (Dynamic) |
| | Thursday | 1 [3] | WRITE (Dynamic) |
| | Friday | 1 [4] | WRITE (Dynamic) |
| | Saturday | 1 [5] | WRITE (Dynamic) |
| | Sunday | 1 [6] | WRITE (Dynamic) |
| | Home (1)/ Away (0) | 1 [7] | WRITE (Dynamic) |
| | Hour | 2 | WRITE (Dynamic) |
| | Minute | 3 | WRITE (Dynamic) |
| | Red | 4 | WRITE (Dynamic) |
| | Green | 5 | WRITE (Dynamic) |
| | Blue | 6 | WRITE (Dynamic) |
| | Dimming | 7 | WRITE (Dynamic) |

TABLE 8

Teach Home and Away Service

| Service | Teach Home/Away | | |
|---|---|---|---|
| Characteristic | Description | Byte | Access |
| Adaptor_Teach_Home_Away_Rq | Home (1)/ Away (0) | 0 | WRITE (Dynamic) |

Accordingly, a user may initiate a device-to-device communications session with each one of controlled devices 130. During the communications sessions, and based upon the defined configuration(s), each of controlled devices 130 may be assigned an address used for identification within the network system. In some embodiments, each of controlled devices 130 may also be taught which other network components (e.g., I/C devices 110, bridge 160, and/or switches 120) to respond to based, for example, upon those components' addresses within the network system. Further, each of controlled devices 130 may be taught automatically scheduled behaviors, such as time-based on/off, color balance, and dimming behaviors.

In some embodiments, one or more desired configuration (s) for the network system can be defined before any switches or controlled devices are added to the network. For example, using an I/C device, a user may establish a network configuration by defining addresses and control behaviors for network components that are expected to become part of the network system. Thus, if the user knows that the network system will initially include 15 switches and 10 controlled devices, the user may define (1) an address for each switch and each controlled device, (2) for each controlled device, which switch or switches to respond to, and (3) for each switch, which controlled device or devices to control. Then, during a device-to-device communications session for a particular network component, the I/C device can perform both the Teach Ids service and the Teach Target service contemporaneously without regard to whether the Device Id/Group Id for a controlled device has already been established. Therefore, it may be possible to establish a device-to-device communications session between an I/C device and each other network component in the network system during which each network component is "taught" its address (e.g., via the Teach Ids service), which other network component(s) to control (e.g., via the Teach Target service), and various other behaviors, such as automatically scheduled control behaviors.

A user may also initiate a device-to-device communications session with each one or more bridges 160. During the communications sessions, and based upon the defined configuration(s), each bridge 160 may be assigned an address used for identification within the network system. Bridge 160 may also store a database containing the configuration of network system 100, which may include, for example, a mapping between switches 120 to controlled devices 130.

During the teaching mode, additional I/C devices 110 may be configured to control one or more network components. Each one of I/C devices 110 may be permitted to control all or a subset of the network components in the network system. In one particular example, a child with a smartphone living in the structure may be permitted to use the smartphone to control the lights in his or her room, but may be restricted from using the smartphone to control household appliances like an oven, range, electric-car charger, dishwasher, or other critical system components like a furnace, sump pump, or water heater, for example.

Figure 6:
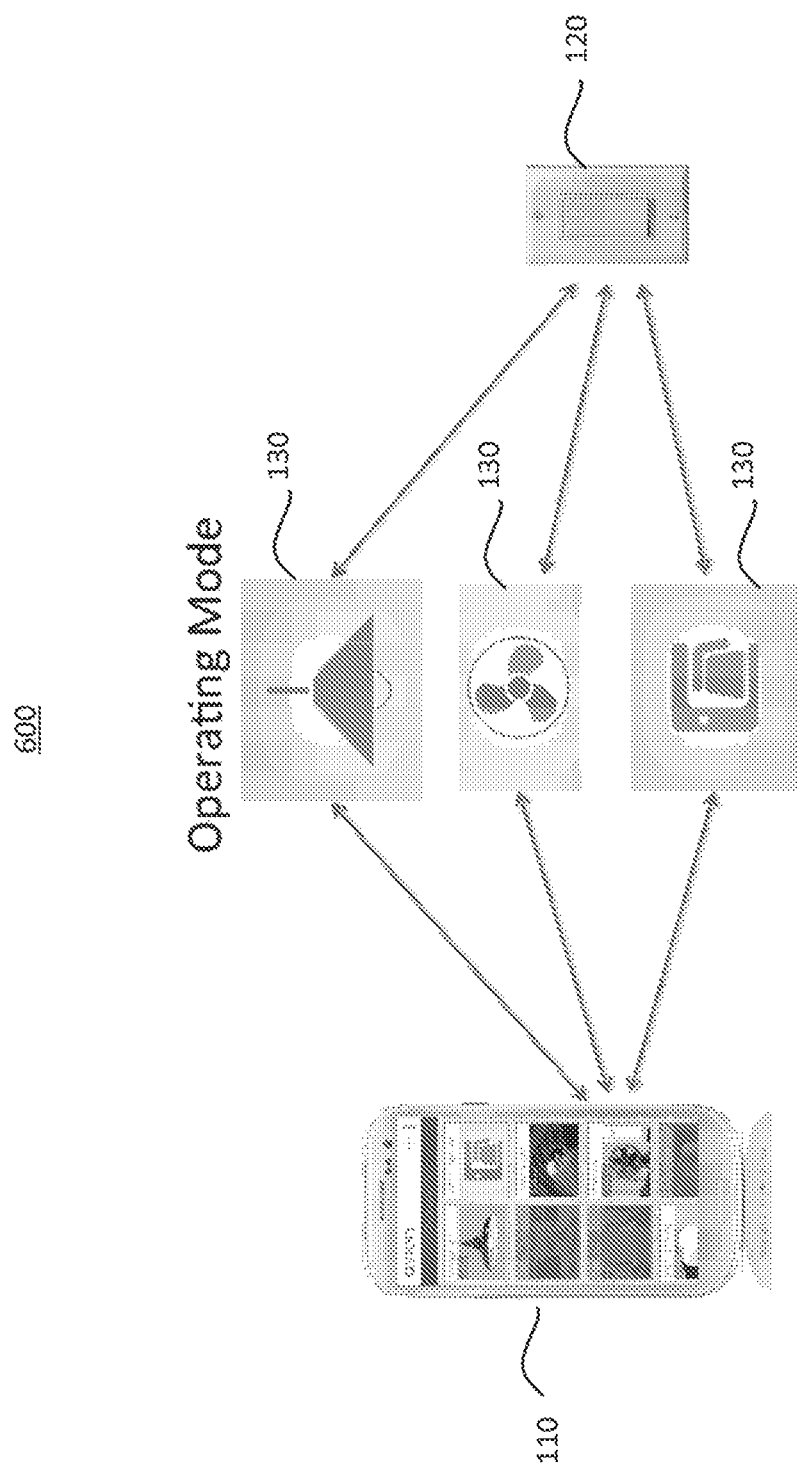

FIG. 6 shows a pictorial diagram of operating mode 600, in accordance with some embodiments. After teaching each network component its role within the network system, the network system may enter operating mode 600. Operating mode may be an autonomous state in which the switches and adaptors can communicate with each other with or without the presence of an I/C device, a central controller, a Wi-Fi® network, or an Internet connection. For example, switches 120 may generate and transmit control signals to adaptors 140 to turn on/off, dim, change speeds, adjust operating priorities, or otherwise implement control functions of controlled devices 130. It should be noted that while switches 120 and adaptors 140 may communicate without the presence of I/C devices 110, these devices may also capable of sending control signals to individual adaptors, groups of adaptors, individual switches, or groups of switches.

FIG. 7A shows a pictorial diagram of remote mode 700A, in accordance with some embodiments. Remote mode 700A may represent an alternative implementation of teaching mode 500 and/or operating mode 600. In remote mode 700A, an Internet-connected device, such as a home router, for example, may translate control signals received via the Internet or other source to wireless commands transmitted by a transmitter capable of generating control signals for switches 120 and adaptors 140. In this manner, teaching mode 500 and operating mode 600 may be controlled from a remote location.

Figure 7B:
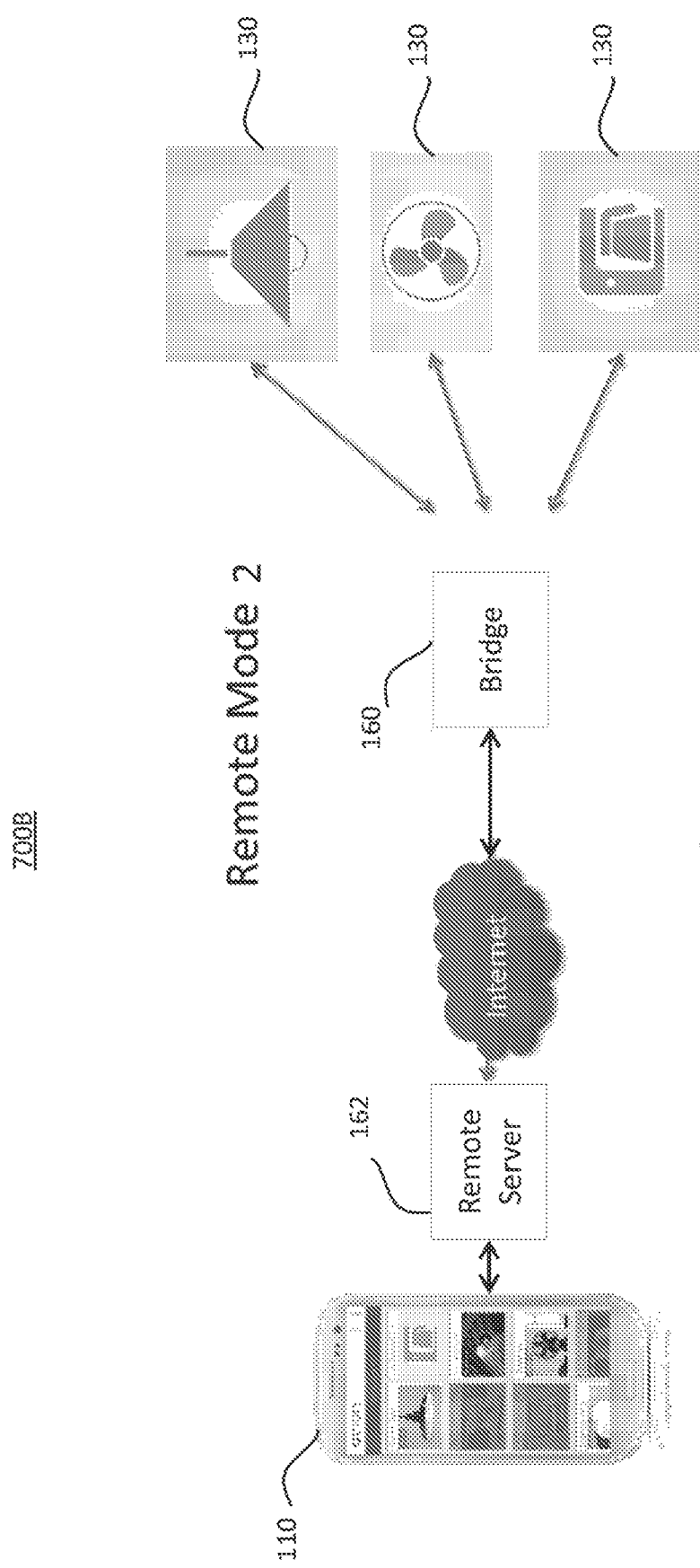

FIG. 7B shows a pictorial diagram of remote mode 700B, in accordance with some embodiments. Remote mode 700B can provide a remote device (e.g., I/C device 110 or any other electronic device capable of communicating with remote server 162) remote access to network system 100 via remote server 162, an outside network, such as the Internet, and bridge 160. Bridge 160, which can be configured during teaching mode 500 as a network component of network system 100, may be implemented as a standalone device with a transceiver for communicating with the other network components of network system 100 and a wired or wireless interface to the outside network or as a "dongle"-type device that can connect to the outside network via an intermediate network-connected device, such as a PC, for example. In either case, I/C devices 110, or any other suitable network-connected device, can connect to bridge 160 via remote server 162 in order to control the various network components of network system 100.

FIG. 8 shows a pictorial diagram of command forwarding mode 800, in accordance with some embodiments. While in teaching mode 500, operating mode 600, remote mode 700A, or remote mode 700B, switches 120 and adaptors 140 can forward control signals from one network component to another by retransmitting control signals or other messages, enabling a command to reach components that would otherwise be out of range of direct device-to-device communication. The forwarding may be accomplished via simple rebroadcast of the message, obviating the need for specific addressing of, or establishing a two-way communications session with, an individual switch 120 or adaptor 140.

FIG. 9 shows a flowchart of an illustrative process 900 for implementing a teaching mode of a network system, in accordance with some embodiments. Process 900 can begin at step 901 in which a network system (e.g., network system 100) is provided having network components that include at least one I/C device (e.g., at least one of I/C devices 110 of FIG. 1), at least one switch (e.g., at least one of switches 120 of FIG. 1), and at least one controlled device (e.g., at least one of controlled devices 130 of FIG. 1). The I/C devices may include any type of computing device capable of communicating with the switch(es) and controlled device(s) using the protocols described herein or any other suitable wired or wireless communications protocol. The switch(es) may be configurable by the I/C device(s) to control the behavior of one or more of the controlled device(s). The controlled device(s) may include any suitable controllable device communicatively coupled to an adaptor (e.g., adaptor 140 of FIG. 2).

At step 903, the desired control behavior of the network components may be defined. Defining the desired control behavior can include establishing a mapping between switches and adaptors to be added to the network system. For example, using an I/C device, a user may establish a network configuration by defining at least one of; an address for each switch and each controlled device to be added to the network system; a mapping of which switch or switches each adaptor respond to; and which controlled device or devices each switch is to control. Step 903 is shown in dashed lines, indicating that this step is optional. In particular, in embodiments in which the desired control behavior for the network system is not defined in advance of configuring the network components, process 900 may proceed directly from step 901 to step 905.

At step 905, each network component may be taught its address within the network system during a master/slave communications session between the network component and an I/C device. Teaching each network component its address may include establishing a device-to-device communications session between an I/C device and each switch and adaptor in the network system, associating the network component with the Location Id of the network system, and assigning the network component a unique address (e.g., using the Teach Switch IDs service and the Teach Adaptor IDs service).

At step 907, each switch may be taught which controlled device(s) (i.e., targets) to control. Step 907 may be conducted using the Teach Target service described above, for example. In some embodiments, adaptors may also be taught which switch(es)'s control signals to implement (e.g., using a service similar to the Teach Target service that instructs an adaptor to implement controls from one or more switches). As noted above with respect to FIG. 5, the target may be defined as a single adaptor (i.e., via a Device ID) or to a group of adaptors (i.e., via a Group ID).

At step 909, each adaptor may be taught a Group ID. Adaptors may be taught a Group ID using the Teach Group Ids service described above, for example. Step 909 is shown in dashed lines indicating that the step is optional. For example, if no groups of controlled devices are defined, step 909 may be omitted.

At step 911, each adaptor may be taught one or more scheduled behaviors. Scheduled behaviors may be taught using one or more of the Set Adaptor Time, Teach Adaptor Schedule, and Teach Home/Away services described above. Step 909 is shown in dashed lines indicating that the step is optional. For example, if no scheduled behaviors are to be defined, step 909 may be omitted. In some embodiments, scheduled behaviors may be taught to one or more switches as well using services similar to those described above for scheduling adaptor behaviors.

Figure 10:
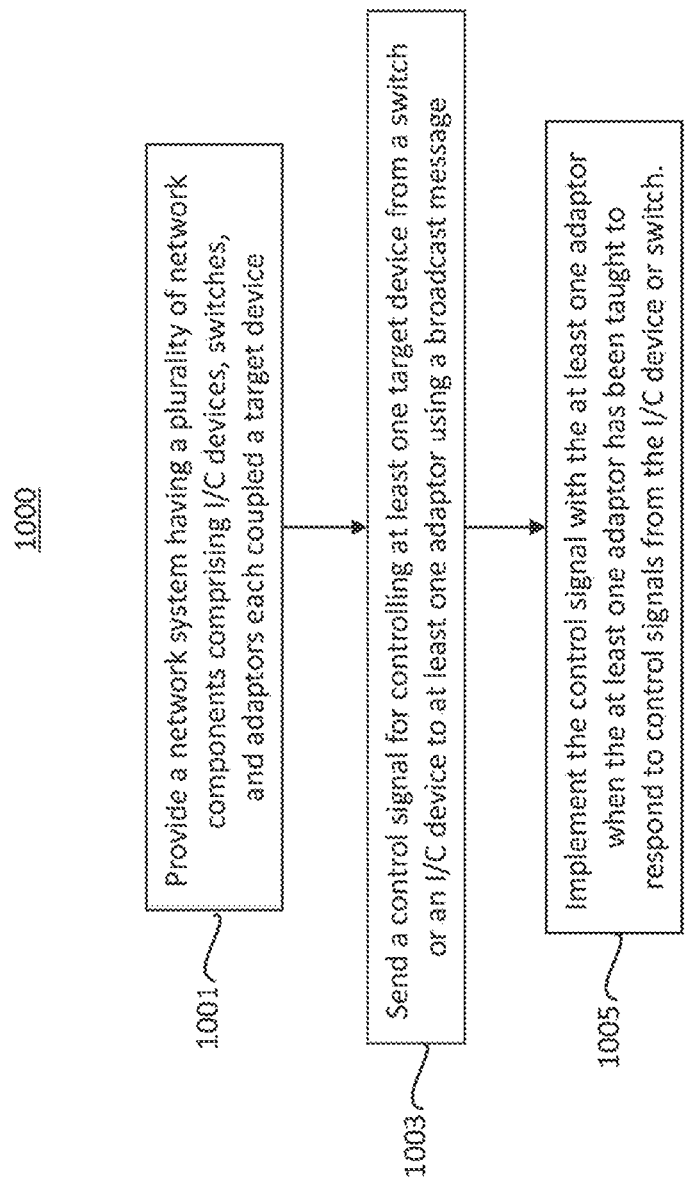
FIG. 10 shows a flowchart of an illustrative process for operating a network system, in accordance with some embodiments.

FIG. 10 shows a flowchart of an illustrative process 1000 for operating a network system, in accordance with some embodiments. Process 1000 may begin at step 1001, in which a network system having network components, including I/C devices, switches, and controlled devices (e.g., network system 100, I/C devices 110, switches 120, and controlled devices 130 of FIG. 1), may be provided. In some embodiments, the network system may be configured using process 900 of FIG. 9.

At step 1003, a control signal may be broadcast to all network components of the network system. The control signal may be sent from one of the switches or one of the I/C devices, for example, and may be addressed to an adaptor of a controlled device (e.g., using a Device Id) or to a group of adaptors (e.g., using a Group Id). In some preferred embodiments, the control signal may be sent from a transceiver of the I/C device or switch using a short-range wireless communications protocol, such as Bluetooth®, for example. In these embodiments, the control signal may be received and retransmitted by each network component of the network system such that the control signal can propagate to all network components the network system even if one or more network components are initially out of the communications range of the I/C device or switch that originated the control signal. In this manner, control of the network system may be effected without the need for a central controller.

At step 1005, the control signal may be implemented by at least one controlled to which the control signal is addressed. In the event that the control signal is addressed to a single adaptor, the addressed adaptor can receive the control signal and implement the control signal via its associated target device. On the other hand, if the control signal is addressed to a group of adaptors, each adaptor can receive and implement the control signal via its associated target device.

Figure 11:
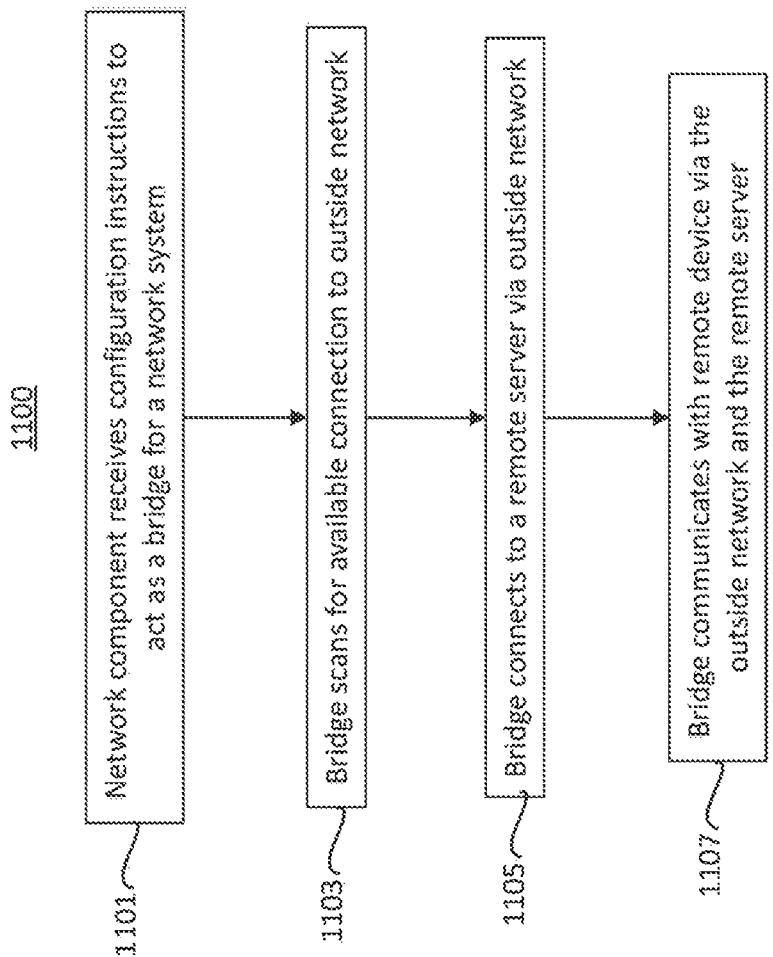
FIG. 11 shows a flowchart of an illustrative process for operating a network system using a bridge, in accordance with some embodiments.

FIG. 11 shows a flowchart of an illustrative process 1100 for configuring a bridge, in accordance with some embodiments. At step 1101, a network component can receive configuration instructions to act as a bridge for a network system. As described above with respect to FIG. 1, the bridge (e.g., bridge 160) may be an existing network component of a network system (e.g., switch 120 or adaptor 140 of network system 100), a dongle-type device that can communicate with a remote server through a device connected to an outside network (e.g., a desktop computer communicatively coupled to the Internet), or the bridge may be a standalone component that can communicate both with other network components via the communications protocol of the network system and an outside network via a separate communications interface (e.g., a WiFi® connection to a home router).

The initialization process for configuring the bridge may be similar to the process used for initializing other network components of the network system using an initialization/control device as described above. Accordingly, the bridge can have access to and send and receive control signals to and from the other network components of the network system, which can allow a remote device communicatively coupled to the bridge to remotely control the network components. Additionally, however, the initialization process for the bridge may include receiving requests at the bridge to scan for available connections to an outside network, and providing the bridge with any authentication credentials that may be required to access the outside network and/or a remote server. These additional steps may be implemented using an initialization/control device, such as the initialization/control device used to configure the bridge as a network component of the network system.

At step 1103, the bridge can scan for an available connection to an outside network. In embodiments in which the bridge is equipped with a WiFi® communications interface, the bridge may be assigned to a WiFi® endpoint able to scan for available WiFi® networks. Once the desired WiFi® network is chosen, the bridge may receive authentication credentials, if necessary, to connect to the WiFi® network. In embodiments in Which the bridge is equipped with a wired connection, such as an Ethernet connection, connection to the outside network may be available without additional authentication. Similarly, if the bridge is embodied as a dongle-type device that communicates with another device having an established connection to an outside network, the bridge device may not require any additional authentication to connect to that outside network, thereby only requiring configuration as a network component of the network system.

At step 1105, the bridge can connect to the remote server via the outside network. The remote server may be a server operated by an entity that provides one or more components of network system 100, such as software, firmware, and/or hardware, including switches 120, and adaptors 140, for example. The remote server may, in turn, be accessed by any electronic device with a communicative connection thereto and with proper authentication credentials.

At step 1107, the bridge can communicate with a remote device via the outside network and the remote server. Once a properly authenticated remote device connects to the remote server, the bridge may provide the remote device (through the remote server) an interface that may present the status of various network components of the network system and facilitate operation of one or more of the network components. In turn, the remote device can display the interface and receive commands to be passed via the remote server to the bridge device for operating one or more of the network components of the network system.

According to some embodiments, network components within network system 100 may communicate with one another using a novel communications protocol. The protocol may incorporate, be built on top of, or otherwise utilize components of the standard Bluetooth® protocol. Using at least a portion of the Bluetooth® protocol to implement communications between components of network system 100 may be advantageous as devices already equipped with Bluetooth® transceivers (e.g., I/C devices 110) are ubiquitous, and individual Bluetooth® transceivers for use in switches 120 and adaptors 140 are inexpensive and widely available.

Device-to-device communications may use different Bluetooth® communications modes depending on the current mode of operation. In teaching mode 500, for example, an I/C device 110 may initiate a master/slave communications session with each switch 120 and adaptor 140 in turn in order to "teach" each component its role within network system 100.

Once each component is taught, implementation commands (e.g., control signals) may be communicated using Bluetooth® broadcast messages in a peer-to-peer configuration. Thus, while each network component may receive every message, a particular component may only listen to and implement those messages addressed to it. Using Bluetooth® broadcast messages to carry messages between components in network system 100, complex emergent behavior may be achieved without the need for a central controller of the network system. Furthermore, specific device-to-device messages are not necessary once the network components have been taught their respective roles.

The broadcast messages can be sent very quickly, allowing near instantaneous command transmission even across multiple devices. Still further, since all elements are peers in the network any number of devices can act as switches and adaptors. Their role in the network may be defined by the role they are taught rather than their inherent design. This method may enable high performance many-to-many networking while working within the current Bluetooth® specification without undue wasted network traffic that could cause interference or shorten battery life.

Details regarding an exemplary embodiment of the novel protocol of this disclosure may be found in Appendices 1-3.

Figure 12:
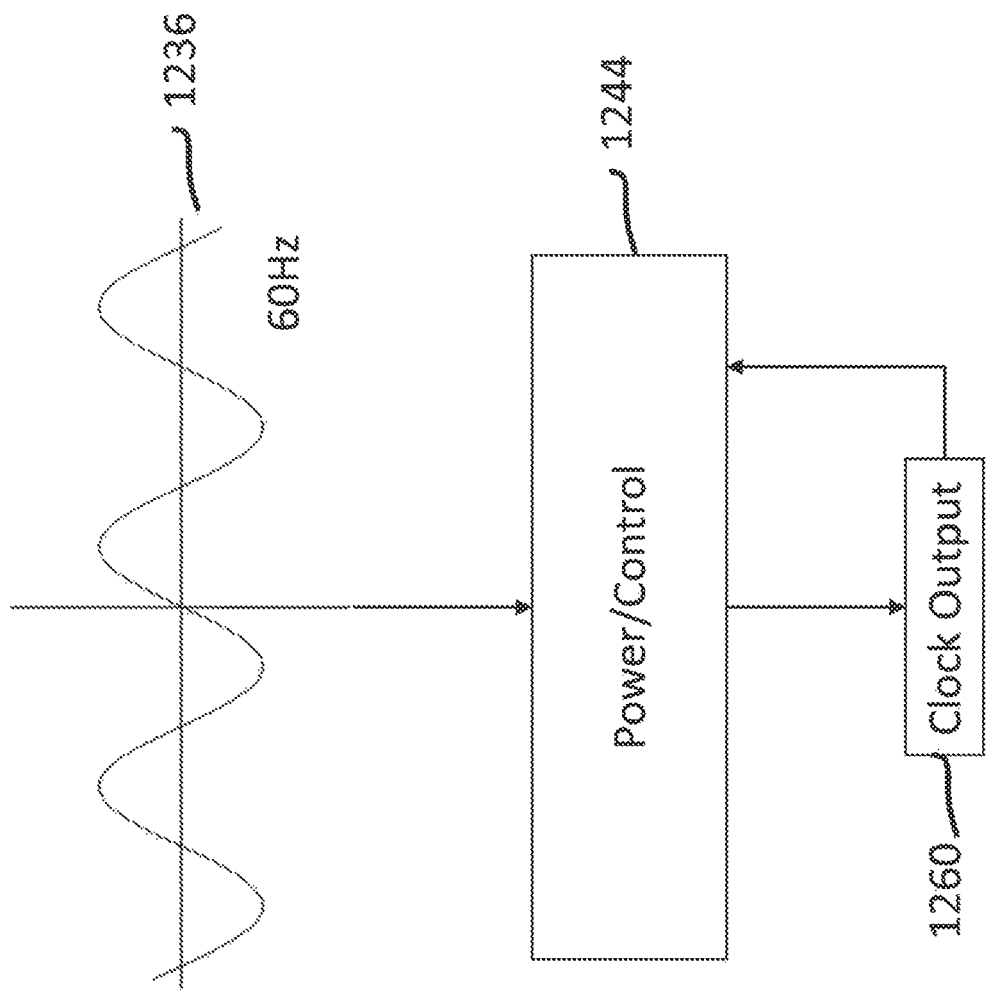
FIG. 12 shows a high-level schematic diagram for providing a software synchronous clock, in accordance with some embodiments.

FIG. 12 shows a high-level schematic diagram for providing a software synchronous clock, in accordance with some embodiments. The software synchronous clock may take an AC power line signal 1236 as an input and generate clock output 1260 for use by power/control unit 1244. The United States uses a frequency of 60 Hz to generate electric power for distribution to residential and commercial customers. This 60 Hz signal can be received at power/control unit 1244 and converted, using software installed on the unit, into clock output 1260. Power/control unit 144 can then use clock output 1260 for timing sensitive applications, such as implementing automatic schedules.

Figure 13:
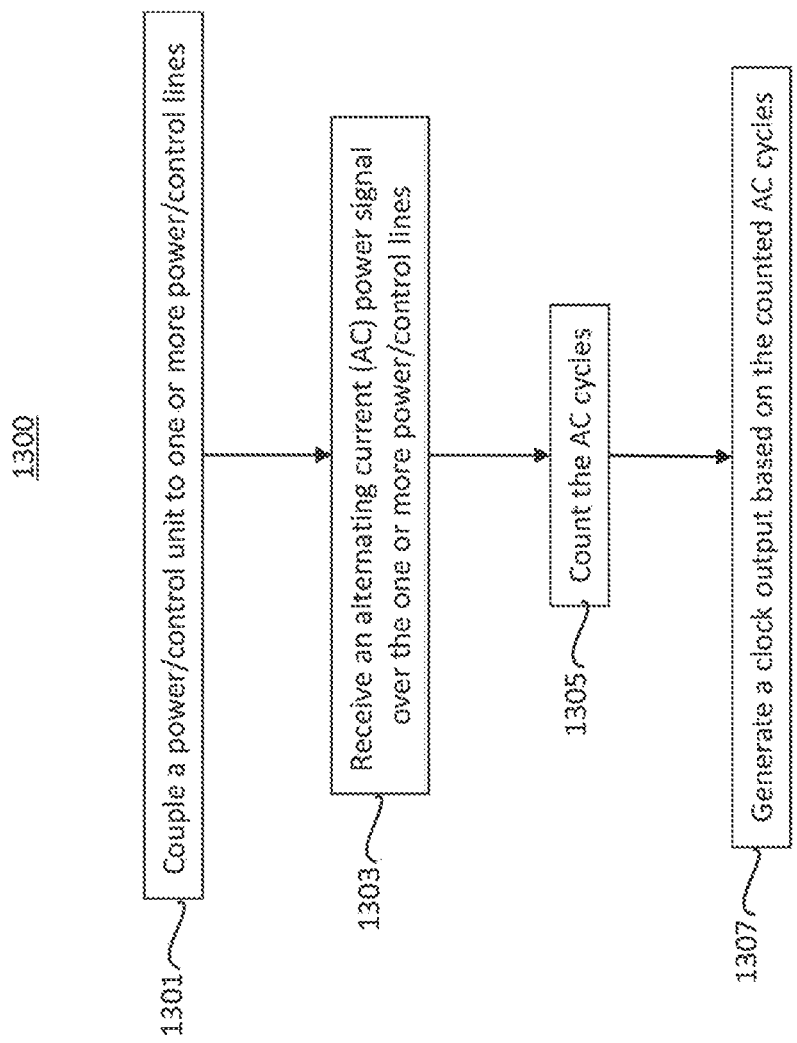
FIG. 13 shows a flowchart of an illustrative process for providing a software synchronous clock, in accordance with some embodiment.

FIG. 13 shows a flowchart of an illustrative process 1300 for providing a software synchronous clock, in accordance with some embodiments. Process 1300 may begin at step 1301, in which a power/control unit (e.g., power/control unit 144 of FIG. 2 or power/control unit 1244 of FIG. 12) may be coupled to one or more power control lines (e.g., power/control lines 136 of FIG. 2).

At step 1303, the power/control unit can receive an AC power signal over the one or more power/control lines. The AC signal may operate at the US standard 60 Hz or any other suitable electric power distribution frequency.

At step 1305, the power/control unit can count the number of AC cycles. For instance, one or more software or firmware implemented counters may be incremented each time a peak (or any other regularly-occurring portion) of the AC signal is detected. Each counter may be used to keep time for a different purpose (e.g., automatically turning on/off a light controlled by the power/control unit, flashing such a light at a defined interval, or performing more complex timed control functions for complex appliances such as thermostats).

At step 1307, the power/control unit can generate a software synchronous clock output based on the counted AC cycles. In some embodiments, the clock output may be (or include) a real-time clock that can be referenced by the power/control unit for complex timing applications. In other embodiments, the power/control unit may simply reference one or more of the counters to determine the amount of time elapsed between two reference points. Thus, if a light controlled by the power/control unit is set to automatically turn off after a defined period of time, once the counter reaches a value associated with the period of time, the light can turn off. Time and number of AC cycles may be related by the following equation:

$$Time_{elapsed} = \frac{\text{\# AC Cycles Counted}}{\text{Frequency of AC Signal}} \quad (1)$$

Current thermostats are limited in their accuracy by the fact that they only measure the temperature, occupancy, or humidity in a single room at a time. This situation often leads to over or under cooling or heating, wasting energy, and/or generally reducing comfort. Using a peer-to-peer, many-to-many control system, such as the systems disclosed above, heating, ventilation, and air conditioning (HVAC)

systems may be designed that permit the measurement of a multitude of HVAC related variables in each room of a structure.

Figure 14:
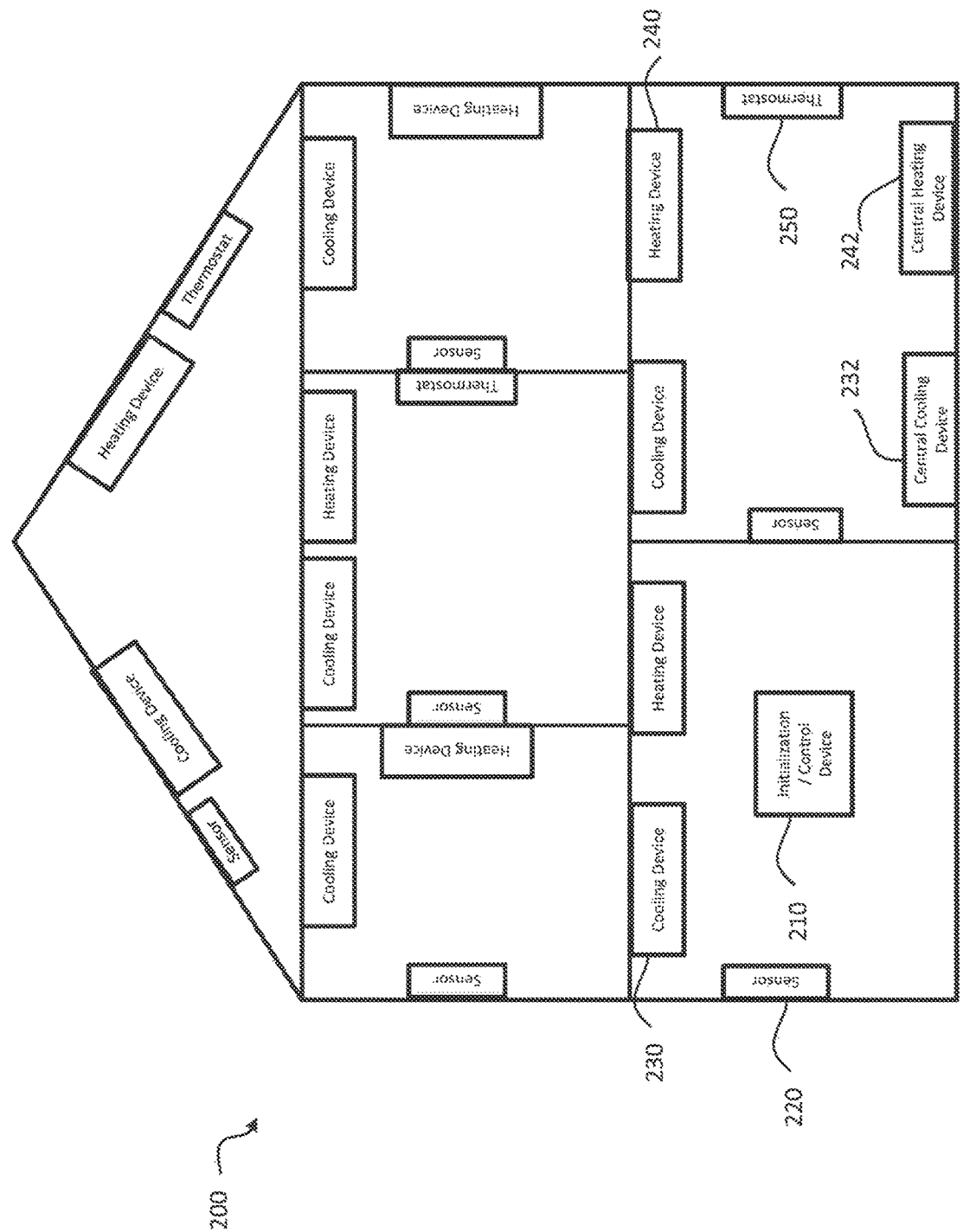
FIG. 14 depicts a schematic diagram of a network system for improving the comfort and efficiency of a HVAC system, in accordance with some embodiments.

FIG. 14 depicts a schematic diagram of network system 200 for improving the comfort and efficiency of a HVAC system, in accordance with some embodiments. Network system 200 can include I/C devices 210, sensors 220, cooling devices 230, central cooling device 232, heating devices 240, central heating device 242, and thermostats 250. Each component of network system 200 may include a transceiver for communicating with the other components in a peer-to-peer, many-to-many control system much like network system 100 described above. Accordingly, once each component of network system 200 is configured, such as by using an initialization process like teaching mode 500 disclosed above, for example, the components can communicate with one another without the need for a central controller.

I/C devices 210 may be similar in many respects to I/C devices 110 of FIG. 1. Thus, I/C devices 210 may be used to configure all of the components of network system 200, control all or a subset of the various system components as appropriate for the type of components or devices present in network system 200.

Sensors 220 may be provided within network system 200 to sense one or more environmental variables in their vicinities. For instance, sensors 220 may sense one or more of: temperature, humidity, atmospheric pressure, occupancy, light, air flow, air quality, and noise level using sensing technology known in the art. By virtue of being a component of network system 200, data sensed at sensors 220 may be made almost instantaneously available to each component of network system 200. Thus, all I/C devices 210, sensors 220, HVAC components 230, 232, 240, and 242 may have access to instantaneous and historical data collected by sensors 220 and shared over network system 200. Sensors 220 may be added to network 220 using the straightforward initialization process described above, so it can be trivial to drastically improve the range, type, accuracy, and granularity of environmental readings collected for use in controlling the HVAC system of a building especially over single thermostat (or single thermostat per zone) based HVAC systems. Individual HVAC components 230, 232, 240, and 242 may be individually controlled based on data collected from sensors 220 to more accurately control the correct temperature setting to maximize comfort, minimize energy consumption, or a combination of the two.

While system 200 is directed particularly to HVAC systems, it should be understood that the systems, methods, and protocols described herein may be adapted for use in any suitable type of telemetry application. For example, motion sensors, intrusion sensors, and/or cameras may be provided throughout a structure for use in an alarm system. Each sensor may be configured (e.g., using teaching mode 500 described above) to communicate with each other sensor as well as with controlled devices, such as an alarm klaxon, a cellular or telephone based notification system (e.g., to alert a user or a third party like a police department or monitoring company), and/or an I/C device, for example.

In another example, temperature sensors may be placed upon pipes that are prone to freezing such that signals may be sent, via the network components of the network system, to an adaptor that can control the flow of water through a pipe that is approaching the freezing point.

It should be understood that sensors of all different types may be configured as part of a single network system. Thus, network system 100 and network system 200 may be configured as a single network system for control of controlled devices and for HVAC control. Any other sensors and controlled devices may be added to such a combined system at any time using, for example, teaching mode 500.

Network system 200 can include a variety of HVAC components, including local cooling devices 230 (e.g., freestanding, window mounted, or wall mounted, and mini-split air conditioning units), central cooling devices 232 (e.g., ducted air conditioners), local heating devices 240 (e.g., electric, natural gas, propane, oil, or wood pellet space heaters), and central heating devices 242 (e.g., a furnace with a forced hot air, water circulating, or steam circulating heat distribution system). Each HVAC component may include, or otherwise be communicatively coupled to, a transceiver that facilitates communications with I/C devices 210, sensors 220, the other HVAC components, and/or thermostat 250. In some embodiments, sensors 220 may be configured to exercise thermostatic control over particular HVAC components, or groups thereof, in order to optimize comfort and efficiency throughout the network. By analogy to network system 100, sensors 220 may be similar to switches 120 in that they sense an external input and send control signals to another network component, and HVAC components 230, 232, 240, and 242 may be similar to controlled devices 130 in that they can receive and implement control signals and provided by another network component (e.g., using an adaptor, such as adaptor 140, or with an integrally provided transceiver and power/control modules).

Even in networks with central air conditioning and central heating, it may be advantageous to supplement the HVAC system with local heating and cooling devices to improve efficiency of the system and/or to better control the comfort level throughout the structure. For example, if one room in a house is particularly drafty, a local heating device may be placed in that room to maximize comfort throughout the entire dwelling so that the central heating unit is not required to overheat the rest of the house in order to maintain a comfortable temperature in the drafty room. Practically speaking, every room (or even portions of rooms) in a building may have its own peculiar micro-climate, and efficiency and comfort may be maximized by understanding those peculiarities and providing and controlling HVAC components individually.

Network system 200 is depicted as having central cooling device 232 and central heating device 242 as well as a local cooling device 230, a local heating device 240, and a sensor 220 in each room. While such a system may provide extremely accurate heating and cooling for each room, such an overabundance of equipment may be costly, obtrusive, and/or unnecessary from a climate control perspective. Thus, in accordance with some embodiments, sensors 220 may provide data to help determine where supplemental heating and cooling devices (i.e., local cooling devices 230 and local heating devices 240) should be placed to maximize comfort and efficiency, including up front equipment costs and energy costs associated with various types of HVAC components. Sensors 220 may also help to determine, for a building without central cooling device 232 or central heating device 242, whether the installation of such a system may be part of an efficient HVAC solution for the building.

In an illustrative example, a house incorporating network system 200 may initially be equipped with central cooling device 232 (e.g., a ducted central air conditioning system), central heating device 242 (e.g., a forced hot air heating system), and thermostat 250, which may be a traditional set point based HVAC control device that sends signals to turn on or turn of central cooling device 232 and/or central heating device 242. Sensors 220 may be configured during an initialization process in one or more rooms of the house to determine the various microenvironments currently in existence. Data from sensors 220 can be shared among sensors 220 and thermostat 250 to provide more accurate temperature adjustment than may be possible using thermostat 250 alone. With several sensors 220 placed throughout a house, it may be possible to provide better direction to thermostat 250 than relying on the thermostat alone. Thus, the problem of overheating or overcooling an entire house (or entire zones of a house) based on a single temperature measurement taken at the thermostat can be avoided.

Thermostat 250 may, therefore, operate based upon: the input from a particular sensor (e.g., a sensor in a main living area) at all times; the input from various individual sensors at different times (e.g., a sensor in a main living area during the day and in a bedroom at night); or on a combination of one or more of the sensors in the network (e.g., an average of the temperatures read by each sensor in the network or a defined subset of the sensors in the network). Implementation of these operational modes may depend on the capabilities of thermostat 250. For instance, if thermostat 250 is a conventional mechanical or electronic thermostat, input from sensors 220 may result in an adjustment to the set point of thermostat 250. On the other hand, thermostat 250 may use the various temperature readings from sensors 220 as an input temperature to be compared against a defined set point or set points.

Furthermore, network system 200 can sense disparities between various sensors 220 as the house is heated and cooled using central cooling device 232 and central heating device 242. Based on the data collected, a processor can determine whether efficiency and/or comfort may be optimized by adding a local cooling or heating device to one or more rooms of the house. The processor may be extent in one of the components of network system 200, such as one of I/C devices 210, for example, or in a remote server accessible to network system 200. For example, analysis of the data provided from sensors 220 may indicate that one of the bedrooms in the house is much colder than the rest of the house during the winter months. Optimization of the HVAC system may, therefore, call for a local heating device to be placed in that room that can be controlled individually to make that room comfortable while avoiding overheating the rest of the house.

Analyzing the data provided by sensors 220 to determine whether one or more local heating or cooling devices should be supplied to optimize comfort and efficiency in the building served by network system 200 may include, for example: determining the difference between the temperature reading for each sensor 220 in network system 200 and the other sensors (e.g., with reference to the average and/or median temperature sensed by all sensors 220 or the balance of the sensors) in network system 200 over a wide range of temperatures; comparing the humidity detected by each sensor 220 with the other sensors in network system 200; calculating the necessary power ratings for a local heating and/or cooling devices that may be used to supplement central cooling device 232 and central heating device 242; calculating the return-on-investment ("ROI") for supplementing central cooling device 232 and central heating device 242 with suggested local heating and cooling devices based at least on the up-front cost of the suggested local heating and cooling devices, their projected energy usage costs, and the cost associated with overheating or overcooling to compensate for particularly hot or cold rooms.

In some embodiments, it may be possible to adjust the output of central cooling device 232 and/or central heating device 242 at various points throughout network system 200 without the addition of local heating or cooling devices. For instance, vents in communication with ducts of central cooling device 232 and/or central heating device 242 may be individually controllable to adjust the delivery of conditioned air to particular areas of the house. If each vent is equipped with an adaptor, such as adaptor 140 of FIG. 1, for example, configured to receive control signals from the other network, the vents may opened or closed as necessary to achieve better localized control of the climate throughout the building served by network system 200.

It should be understood that while the example provided above involved a network having central heating and cooling devices, similar climate control may be implemented using a network having only local heating and cooling devices.

During operation of network system 200, the network components can work together to efficiently provide HVAC control to the entire building. HVAC control may be exercised a number of ways depending on the components available in network system 200, including: (1) communicating a new set point to thermostat 250; (2) communicating with a remote server-based interface to an energy control system connected to network system 200 via a wireless or wired outside network connection; (3) communication directly to the control panel of central cooling device 232 and/or central heating device 242; and (4) communication directly to one or more local cooling devices 230 and/or local heating devices 240. Accordingly, network system 200 may have the ability to manage whole-house comfort without or in conjunction with a central heating or air conditioning system, and even without traditional thermostatic control for heating and cooling.

While there have been described networking systems, protocols, and methods for controlling target devices, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A network system, comprising:
    a bridge, comprising:
        a transceiver configured to send and receive control signals via a short-range wireless communications protocol;
        a memory storing a Device Id identifying the bridge;
        a central processor configured to execute instructions stored in the memory; and
        a network interface facilitating connectivity to a remote server via an outside network, wherein the bridge is configured to receive a first control signal from the remote server via the outside network, and wherein the bridge is configured to broadcast, using the transceiver, the first control signal received from the remote server;
    at least one adaptor, each comprising:

a transceiver configured to send and receive control signals via a short-range wireless communications protocol;

a memory storing a Location Id identifying the network system and at least one of a Group Id and a Device Id identifying the adaptor; and a central processor configured to execute instructions stored in the memory;

at least one target device communicatively coupled to each adaptor; and at least one switch, each comprising:

a transceiver configured to send and receive control signals via the short-range wireless communications protocol;

a memory storing the Location Id, a Device Id identifying the switch, and a target address identifying the adaptor(s) the switch is programmed to control; and a central processor configured to execute instructions stored in the memory, wherein each switch is configured to generate and broadcast a second control signal carrying the target address in response to receiving the first control signal, and wherein each adapter is configured to receive the second control signal and operate the target device based on the second control signal when the target address matches the Group Id or the Device Id identifying the adaptor.

2. The network system of claim 1, each adaptor further comprising a power/control module communicatively coupled between the transceiver and the at least one target device communicatively coupled to the adaptor, wherein the power/control module receives the control signal from the transceiver and is responsible for implementing the control signal on the at least one target device.

3. The network system of claim 1, wherein the network system comprises at least three adaptors, and wherein the Group Id is assigned to at least two of the adaptors.

4. The network system of claim 1, further comprising an initialization/control ("I/C") device, the initialization/control device comprising:

a transceiver configured to send and receive control signals via the short-range wireless communications protocol;

a memory storing a Device Id; and a central processor configured to execute instructions stored in the memory, wherein the memory further stores configuration and programming information, and wherein at least a portion of the configuration and programming information is transmitted to each switch and each adaptor of the network system in order to assign each switch and each adaptor a corresponding Device Id and to assign each switch a target address identifying the adaptor(s) the switch is configured to control.

5. The network system of claim 4, the I/C device configured to broadcast a control signal comprising one of a Device Id and a Group Id to each network component of the network system.

6. The system of claim 1, wherein a control signal broadcast from a switch is received directly by each switch and adaptor within range of the switch via the short-range wireless communications protocol, and wherein each switch and adaptor that receives the control signal rebroadcasts the control signal until the control signal has reached each switch and adaptor of the network system.

7. The system of claim 1, wherein the switch comprises an input sensor, and wherein the control message is generated as a result of a user input sensed by the user input sensor.

8. A method for operating a network system, comprising:

providing the network system, comprising:

a bridge having a transceiver configured to send and receive control signals via a short-range wireless communications protocol, and a network interface facilitating connectivity to a remote server via an outside network, wherein the bridge is configured to receive a first control signal from the remote server via the outside network, and wherein the bridge is configured to broadcast, using the transceiver, the first control signal received from the remote server, at least one switch having a transceiver configured to send and receive control signals via a short-range wireless communications protocol, at least one adaptor having a transceiver configured to send and receive control signals via a short-range wireless communications protocol, and at least one target device communicatively coupled to each adaptor;

generating and broadcasting, from the at least one switch and in response to the first control signal, a second control signal for controlling at least one target device, the control signal comprising a target address identifying the adapter(s) the switch is programmed to control;

receiving, by the at least one adaptor, the second control signal;

determining, by each adaptor, whether the target address matches a Group Id or a Device Id identifying the adaptor; and for each adaptor with a Group Id or a Device Id matching the target address, implementing the second control signal to control the at least one target device communicatively coupled to the adaptor.

9. The method of claim 8, wherein implementing the second control signal comprises:

sending the second control signal to a power/control module of the adaptor, which is responsible for implementing the second control signal on the at least one target device communicatively coupled to the adaptor.

10. The method of claim 8, wherein the network system includes at least three adaptors, and wherein the Group Id is assigned to at least two of the adaptors.

11. The method of claim 8, further comprising:

generating, by an initialization/control device, configuration and programming information comprising, for each switch and each adaptor, at least a Location Id defining the network system and a unique Device Id defining the switch or adaptor;

transmitting from a transceiver of the initialization/control ("I/C") device, the configuration and programming to each switch and each adaptor.

12. The network system of claim 11, further comprising:

broadcasting, from the initialization/control device, a third control signal for controlling at least one target device, the third control signal comprising a target address.

13. The method of claim 12, further comprising:

receiving, by the at least one adaptor, the third control signal;

determining, by each adaptor, whether the target address of the third control signal matches a Group Id or a Device Id identifying the adaptor; and for each adaptor with a Group Id or a Device Id matching the target address of the third control signal, implementing the third control signal to control the at least one target device communicatively coupled to the adaptor.

14. The method of claim 8, further comprising:

receiving, by each switch and adaptor within range of the switch via the short-range wireless communications protocol, the second control signal; and rebroadcasting the second control signal, by each switch and adaptor that receives the second control signal, until the second control signal has reached each switch and adaptor of the network system.

\* \* \* \* \*